US012654756B2

(12) United States Patent
Li

(10) Patent No.: US 12,654,756 B2
(45) Date of Patent: Jun. 16, 2026

(54) STORAGE SYSTEM

(71) Applicant: HANGZHOU GREAT STAR INDUSTRIAL CO., LTD., Hangzhou (CN)

(72) Inventor: Yueming Li, Hangzhou (CN)

(73) Assignee: HANGZHOU GREAT STAR INDUSTRIAL CO., LTD., Hangzhou (CN)

( * ) Notice: Subject to any disclaimer, the term of this patent is extended or adjusted under 35 U.S.C. 154(b) by 309 days.

(21) Appl. No.: 18/227,985

(22) Filed: Jul. 31, 2023

(65) Prior Publication Data

US 2024/0217571 A1 Jul. 4, 2024

Related U.S. Application Data

(63) Continuation of application No. PCT/CN2022/142791, filed on Dec. 28, 2022.

(51) Int. Cl.
B62B 3/02 (2006.01)
(52) U.S. Cl.
CPC .................................... B62B 3/022 (2013.01)
(58) Field of Classification Search
CPC .................................................... B62B 3/022
See application file for complete search history.

(56) References Cited

U.S. PATENT DOCUMENTS

| | | | | |
|---|---|---|---|---|
| 5,806,864 | A * | 9/1998 | Zielinski | B62B 3/02 |
| | | | | 280/42 |
| 8,528,918 | B2 * | 9/2013 | Macias | B62B 3/02 |
| | | | | 280/47.35 |
| 11,034,370 | B2 * | 6/2021 | Cao | B62B 3/022 |
| 2020/0405050 | A1 | 12/2020 | Liu | |

FOREIGN PATENT DOCUMENTS

| | | |
|---|---|---|
| CN | 102551360 A | 7/2012 |
| CN | 210790896 U | 6/2020 |
| CN | 213154737 U | 5/2021 |
| CN | 113367486 A | 9/2021 |
| CN | 214790307 U | 11/2021 |
| CN | 218112694 U | 12/2022 |

OTHER PUBLICATIONS

International Search Report of PCT/CN2022/142791.
Second Notice of Reasons for Refusal of CA3210282.

* cited by examiner

*Primary Examiner* — Bryan A Evans

(57) ABSTRACT

The present disclosure provides a storage system, which includes a chassis, a supporting frame and at least one intermediate plate movably connected to the supporting frame. The supporting frame includes a first folding mechanism connected to the chassis and a second folding mechanism. The intermediate plate is capable of rotating along with the first folding mechanism and/or the second folding mechanism. The first folding mechanism and the second folding mechanism can move close to the chassis through a space, so that the storage system is switched to the folded state.

17 Claims, 25 Drawing Sheets

63

213

F

H

223

I

214

82

71

STORAGE SYSTEM

CROSS-REFERENCE TO RELATED APPLICATIONS

This application is a continuation of international patent application No. PCT/CN2022/142791, filed on Dec. 28, 2022, and titled "STORAGE SYSTEM". The contents of the above identified applications are hereby incorporated herein in their entireties by reference.

TECHNICAL FIELD

The present disclosure relates to the field of object storing, in particular, to a storage system.

BACKGROUND

In a foldable multi-layer storage system of the related art, a crossed folding support mechanism can be disposed between adjacent two plates. The crossed folding support mechanism occupies certain space between the adjacent two plates when the foldable multi-layer storage system is folded, so that the intermediate plate cannot completely fit with the adjacent two plates, resulting in the storage system with a relatively great space in the folded state. Thus, it needs more space to store the storage system, and it is not convenient to convey the storage system and a packing cost of the storage system is high.

SUMMARY

In view of above, it is necessary to provide a storage system to solve the problems above.

A storage system includes a chassis; a supporting frame including a plurality of first supporting rods and a plurality of second supporting rods, wherein the plurality of first supporting rods and the plurality of second supporting rods are connected to the chassis and rotatable relative to the chassis, the plurality of first supporting rods are defined as a first folding mechanism, and the plurality of second supporting rods are defined as a second folding mechanism; and at least one intermediate plate movably connected to the supporting frame. The storage system has a first using state and a folded state. When the storage system is in the first using state, a first inclined angle is defined between the plurality of first supporting rods and the chassis, and a second included angle is defined between the plurality of second supporting rods and the chassis, respectively. The at least one intermediate plate is located at a middle of the supporting frame. The at least one intermediate plate is capable of rotating until to a position adjacent to the first folding mechanism and/or the second folding mechanism, so as to define a space in the middle of the supporting frame. The intermediate pale is further capable of rotating along with the first folding mechanism and/or the second folding mechanism. The second folding mechanism is capable of rotating until to a position adjacent to the chassis through the space, and the first folding mechanism is capable of rotating until to a position adjacent to the second folding mechanism, so that the storage system is switched to the folded state.

In some embodiments, the storage system further includes a connecting structure. The at least one intermediate plate is rotatably connected to the plurality of the first supporting rods via the connecting structure. The at least one intermediate plate includes a first end and a second end away from each other. The first end of the at least one intermediate plate is capable of rotating to a bottom end of the first folding mechanism along with rotating of the connecting structure, and the second end of the at least one intermediate plate is capable of rotating to a top end of the first folding mechanism.

In some embodiments, the connecting structure includes two first sliders. The two first sliders protrudes from two sides of the first end of the at least one intermediate plate, respectively, and the two sides of the first end of the at least one intermediate plate are away from each other. The number of the plurality of first supporting rods is two. Each sidewall of the two first supporting rods is provided with a first sliding channel, respectively. The first sliding channel extends along an axis of the first supporting rod, and the two first sliders extend into the first sliding channel, respectively, and are capable of sliding along the first sliding channel.

In some embodiments, the first sliding channel includes a positioning section, a transitional section and a sliding section, which are successively connected with each other. Both the positioning section and the transitional section are located at the top of the sliding section. The sliding section is located on a side of two first supporting rods adjacent to the bottom of the two first supporting rods, and a length of the sliding section is greater than a length of the positioning section. When the at least one intermediate plate is located in the middle of the supporting frame, the two first sliders are located in the positioning section. The two first sliders are capable of sliding to the sliding section via the transitional section, and allowing the first end of the at least one intermediate plate to slide to the bottom end of the first folding mechanism.

In some embodiments, the connecting structure includes two articulated rods. Both ends of each of the two articulated rods are pivotally connected to the at least one intermediate plate and the first supporting rod, respectively. When the storage system is in the first using state, a third inclined angle is defined between the articulated rod and the intermediate plate, and a fourth inclined angle is defined between the articulated rod and the first supporting rod.

In some embodiments, second sliders protruding from two sides of the first end of the at least one intermediate plate are provided, and the two sides of the first end of the at least one intermediate plate are away from each other. The number of the plurality of the first supporting rods is two. Sidewalls of the two first supporting rods are provided with a second sliding channel, respectively, and the sidewalls of the two first supporting rods are opposite to each other. The two second sliding channels extend along an axis of the first supporting rod. The two second sliders extend into the two second sliding channels, respectively, and are capable of sliding along the two second sliding channels, respectively.

In some embodiments, the at least one intermediate plates includes a first intermediate plate and a second intermediate plate. The first intermediate plate is rotatably connected to the first supporting rod via the connecting structure. A first end of the first intermediate plate is capable of rotating until to a position adjacent to the bottom of the first folding mechanism via the connecting structure, and a second end of the first intermediate plate is capable of rotating until to a position adjacent to the top of the first folding mechanism. The second intermediate plate is rotatably connected to the second supporting rod via the connecting structure. A second end of the second intermediate plate is capable of rotating until to a position adjacent to the bottom of the second folding mechanism via the connecting structure, and a first end of o the second intermediate plate is capable of rotating until to a position adjacent to the top of the second folding mechanism.

In some embodiments, the at least one intermediate plate includes a first plate body and a second plate body. The first plate body is rotatably connected to the plurality of first supporting rods. The second plate body is rotatably connected to the first plate body, and the second plate body is detachably connected to the plurality of second supporting rods. When the storage system is in the first using state, the first plate body and the second plate body are located in the same plane and in the middle of the supporting frame. The first plate body and the second plate body are capable of being folded up and rotating together until to a position adjacent to the first folding mechanism, resulting in the storage system being switched to the folded state.

In some embodiments, the at least one intermediate plate includes a first plate body and a second plate body connected with each other, and the first plate body and the second plate body are slidable relative to each other. The first plate body is rotatably connected to the second supporting rod, and the second plate body is detachably connected to the second supporting rod. When the storage system is in the first using state, the second plate body is capable of sliding out relative to the first plate body, and the second plate body is connected to the second supporting rod. When the storage system is in the folded state, the second plate body is separated from the second supporting rod, the second plate body is capable of sliding and overlapping with the first plate body, and the first plate body is capable of rotating along with the second plate body until to a position adjacent to the first folding mechanism.

In some embodiments, the at least one intermediate plate includes a first plate body and a second plate body detachably connected with each other. The first plate body is rotatably connected to the first supporting rod, and the second plate body is rotatably connected to the second supporting rod. When the storage system is in the first using state, the first plate body and the second plate body are located in the same plane and in the middle of the supporting frame. When the storage system is in the folded state, the second plate body is capable of rotating until to a position adjacent to the second folding mechanism and the second folding mechanism is capable of rotating along with the second plate body until to a position adjacent to the chassis, and the first plate body is capable of rotating until to a position adjacent to the first folding mechanism and the first folding mechanism is capable of rotating along with the first plate body until to the position adjacent to the second folding mechanism.

In some embodiments, the storage system further includes a first clamping structure and a second clamping structure. The first clamping structure matches with the second clamping structure and is detachably connected with the second clamping structure. One of the first clamping structure and the second clamping structure is disposed on the at least one intermediate plate, the other of the first clamping structure and the second clamping structure is disposed on the second folding mechanism. When the storage system is in the first using state, the first clamping structure and the second clamping structure are clamped to and fixed with each other, so that the at least one intermediate plate is fixed in the middle of the supporting frame.

In some embodiments, when the storage system is in the first using state, a side of the at least one intermediate plate towards the second folding mechanism is provided with a second protrusion and the second protrusion is defined as the first clamping structure, and a side of the second supporting rod towards the at least one intermediate plate is provided with a positioning hole and the positioning hole is defined as the second clamping structure. When the storage system is switched from the first using state to the folded state, the second protrusion is capable of separating from the positioning hole along with rotation of the at least one intermediate plate. When the storage system is switched from the folded state to the first using state, the second protrusion is capable of rotating and being clamped in the positioning hole along with the rotation of the at least one intermediate plate, so that the at least one intermediate plate is kept in the middle of the supporting frame.

In some embodiments, the second folding mechanism includes a first connecting rod. The first connecting rod is fixed between two second supporting rods and in the middle of the supporting frame, and the second clamping structure is disposed on the first connecting rod.

In some embodiments, the first clamping structure includes a first pedestal, a first switch, a first clamping member and a first elastic member. The first pedestal is fixed to the at least one intermediate plate. The first pedestal is provided with a bar-shaped sliding slot. The first switch extends into the sliding slot and is capable of sliding in the sliding slot. Both the first switch and the first elastic member are accommodated in the first pedestal. The first switch is fixed to the first clamping member. One end of the first elastic member abuts against an inner wall of the first pedestal, and the other end of the first elastic member is capable of elastically acting on the first clamping member. The second clamping structure includes a second clamping member, and the second clamping member is fixed to the first connecting rod. The first clamping member is capable of moving along with the first switch, and the first clamping member and the first switch are capable of moving away from the second clamping member, resulting in the first camping member separating from and being unlocked with the second clamping member. Under the action of the first elastic member, the first clamping member is capable of recovering, and being clamped to and locked with the second clamping member.

In some embodiments, the storage system further includes a first positioning structure and a second positioning structure. The first positioning structure matches with the second positioning structure and is detachably connected to the second positioning structure. One of the first positioning structure and the second positioning structure is disposed on the at least one intermediate plate, and the other of the first positioning structure and the second positioning structure is disposed on the first folding mechanism. The first positioning structure is capable of clamping to and fixing with the second positioning structure, so that the at least one intermediate plate is capable of rotating to a position adjacent to the first folding mechanism and being fixed to the first folding mechanism.

In some embodiments, the first positioning structure includes a first protrusion. The first protrusion is disposed on a side edge of the second end of the at least one intermediate plate. The second positioning structure includes a first groove. The first groove is provided on the top of the first supporting rod. When the second end of the at least one intermediate plate rotates to a position adjacent to the top of the first supporting rod, the first protrusion is capable of clamping in the first groove.

In some embodiments, the first folding mechanism includes a second connecting rod. The second connecting rod is fixed between the two first supporting rods and located at the top of the supporting frame, and the second positioning structure is disposed on the second connecting rod.

In some embodiments, the first positioning structure includes a third clamping member. The second positioning structure includes a second pedestal, a second switch, a fourth clamping member and a second elastic member. The second pedestal is fixed to the second connecting rod, and a slit is defined between the first supporting rod and the second pedestal. The second switch and the fourth clamping member are mounted on the second pedestal and capable of moving relative to the second pedestal. The second elastic member is configured to elastically act on the second switch or the fourth clamping member. The fourth clamping member is capable of extending out from the second pedestal and extending into the slit. When the at least one intermediate plate rotates to the position adjacent to the first folding mechanism, the third clamping member is capable of entering into the slit. The fourth clamping member is capable of moving along with the second switch and the fourth clamping member and the second switch are capable of moving away from the third clamping member, resulting in the third clamping member separating from and being unlocked with the fourth clamping member. Under the action of the second elastic member, the fourth clamping member is capable of recovering, and being clamped to and locked with the third clamping member.

In some embodiments, the storage system further has a second using state. When the storage system is in the second using state, the at least one intermediate plate is capable of rotating until to a position adjacent to the first folding mechanism and being fixed to the first folding mechanism, and the storage system is in L-shaped.

In some embodiments, the storage system further includes a support. The support is fixed to the chassis. The first folding mechanism is rotatably connected to the support, and a height of the support matches with a thickness of the second folding mechanism. When the storage system is in the folded state, the second folding mechanism is capable of rotating until to a position parallel to the chassis and being in contact with the chassis, and the first folding mechanism is capable of rotating until to a position parallel to the second folding mechanism and being in contact with the second folding mechanism. In some embodiments, the storage system further includes a locking structure.

The locking structure is mounted on the support. The locking structure has a first locking state, a second locking state and an unlocking state. When the locking structure is in the first locking state, the locking structure is capable of fixing the first folding mechanism to the first using state. When the locking structure is in the second locking state, after the first folding mechanism folds and rotates to a position adjacent to the second folding mechanism, the locking structure is capable of fixing the first folding mechanism. When the locking structure is in the unlocking state, the locking structure is capable of allowing the first folding mechanism to rotate.

In some embodiments, a side of the support adjacent to the second folding mechanism is provided with a first abutting block. A side of the support away from the second folding mechanism is provided with a sliding groove. A second abutting block protruding from the first supporting rod is provided. The locking structure includes a foot rest lever and a third elastic member. The foot rest lever is capable of sliding in the sliding groove, and the third elastic member is connected to the foot rest lever and capable of elastically acting on the foot rest lever. When the locking structure is in the first locking state, the foot rest lever abuts against the second abutting block under elastic action of the third elastic member, and a side of the first supporting rod away from the second abutting block abuts against the first abutting block. When the locking structure is in the second locking state, the foot rest lever abuts against the side of the first supporting rod away from the second abutting block under the action of the third elastic member.

In some embodiments, a bottom of the first supporting rod is arc-shaped. The foot rest lever is provided with a stop protrusion, and a joint between the third elastic member and the foot rest lever is located between the stop protrusion and the support.

In some embodiments, the first supporting rod is rotatably connected to the support via a rotating shaft protruding from the support, and an end of the third elastic member is sleeved on the rotating shaft and the other end of the third elastic member is sleeved on the foot rest lever.

Details of one or more embodiments of the present disclosure will be set forth in the accompanying drawings and description hereinafter. Other features, objects, and advantages of the present disclosure will become apparent from the specification, the accompanying drawings, and the claims.

BRIEF DESCRIPTION OF THE DRAWINGS

In order to illustrate the embodiments of the present disclosure more clearly, the drawings used in the embodiments will be described briefly. Apparently, the following described drawings are merely for the embodiments of the present disclosure, and other drawings can be derived by those of ordinary skill in the art without any creative effort.

Figure 1:
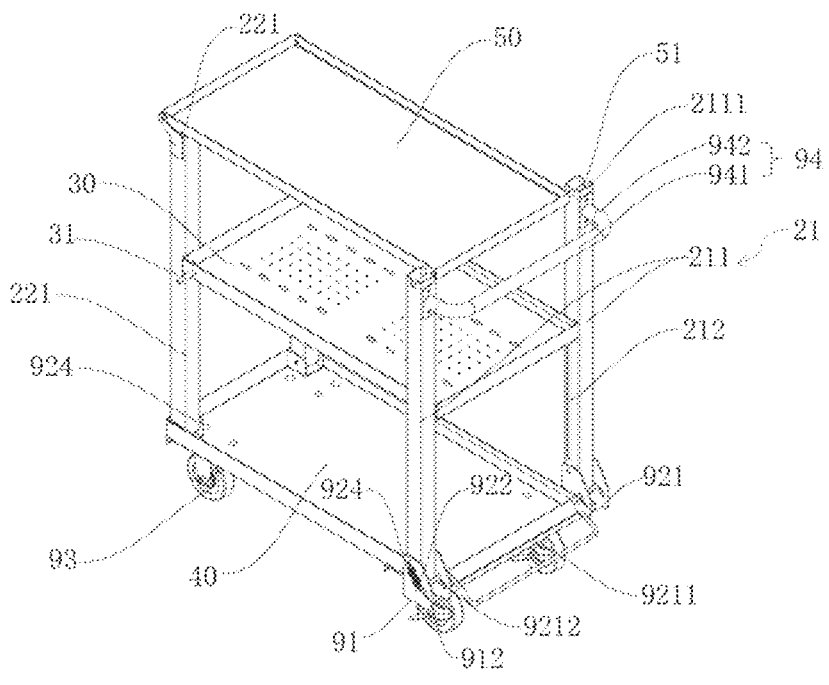
FIG. 1 is a structural schematic diagram of a storage system in a first embodiment of the present disclosure in a first using state.

In the figures, 100 represents a storage system; 10 represents a chassis; 20 represents a supporting frame; 201 represents a space; 21 represents a first folding mechanism; 211 represents a first supporting rod; 2111 represents a first groove; 212 represents a first sliding channel; 2121 represents a positioning section; 2122 represents a transitional section; 2123 represents a sliding section; 213 represents a second sliding channel; 214 represents a second connecting rod; 215 represents a second abutting block; 22 represents a second folding mechanism; 221 represents a second supporting rod; 2211 represents a positioning hole; 222 represents a first connecting rod; 223 represents a second groove; 30 represents an intermediate plate; 30a represents a first end; 30b represents a second end; 31 represents a first protrusion; 32 represents a second protrusion; 33 represents a first plate body; 34 represents a second plate body; 35 represents a rotating connecting member; 36 represents a first intermediate plate; 37 represents a second intermediate plate; 40 represents a bottom plate; 50 represents a top plate; 51 represents a third protrusion; 60 represents a connecting structure; 61 represents a first slider; 62 represents a articulated rod; 63 represents a second slider; 71 represents a first clamping structure; 711 represents a first pedestal; 712 represents a first switch; 713 represents a first clamping member; 714 represents a first elastic member; 715 represents a sliding slot; 72 represents a second clamping structure; 721 represents a second clamping member; 81 represents a first positioning structure; 811 represents a third clamping member; 82 represents a second positioning structure; 821 represents a second pedestal; 822 represents a second switch; 823 represents a fourth clamping member; 824 represents a second elastic member; 825 represents a slit; 91 represents a support; 911 represents a first abutting block; 912 represents a sliding groove; 92 represents a locking structure; 921 represents a foot rest lever; 9211 represents a concave section; 9212 represents a linear section; 922 represents a third elastic member; 923 represents a stop protrusion; 924 represents a rotating shaft; 93 represents a wheel; 94 represents a push-pull member; 941 represents a connecting member; 942 represents a handle; α represents a first inclined angle; β represents a second inclined angle; γ represents a third inclined angle; and δ represents a fourth inclined angle.

DETAILED DESCRIPTION

In order to make the above objects, features and advantages of the present disclosure more obvious and understandable, the following description of specific embodiments of the present disclosure is given in detail in conjunction with the accompanying drawings. Many specific details are set forth in the following description in order to facilitate a full understanding of the present disclosure. However, the present disclosure is capable of being practiced in many other ways different from those described herein, and those skilled in the art may make similar improvements without violating the connotations of the present disclosure, and thus the present disclosure is not limited by the specific embodiments disclosed below.

In the description of the present disclosure, it is to be understood that the terms "center", "longitudinal", "crosswise," "length," "width," "thickness," "up", "down", "front", "back", "left", "right", "vertical", "horizontal", "top", "bottom", "inside", "outside", "clockwise", "anticlockwise", "axial," "radial," "circumferential." etc. indicate an orientation or positional relationship based on the orientation or positional relationship shown in the accompanying drawings. These terms are used merely for the purpose of facilitating and simplifying the description of the present disclosure, and are not intended to indicate or imply that the device or element referred to must have a particular orientation, be constructed and operated in a particular orientation, and therefore are not to be construed as a limitation of the present disclosure.

Furthermore, the terms "first" and "second" are used for descriptive purposes only and are not to be understood as indicating or implying relative importance or implicitly specifying the number of technical features indicated. Thus, a feature defined with the terms "first", "second" may explicitly or implicitly include at least one such feature. In the description of the present disclosure, "plurality" means at least two, e.g., two, three, etc., unless otherwise expressly and specifically limited.

In this disclosure, unless otherwise expressly specified and limited, the terms "mounting", "communicated", "connected", "fixed", etc. shall be understood broadly. For example, it may be a fixed connection, a removable connection, or a one-piece connection; it may be a mechanical connection or an electrical connection; it may be a direct connection or an indirect connection via an intermediate medium, and it may be a communication between two elements or an interactive relationship between the two elements, unless expressly limited otherwise. To one of ordinary skill in the art, the specific meaning of the above terms in this disclosure may be understood on a case-by-case basis.

In the present disclosure, unless otherwise expressly specified and limited, the first feature "on" or "below" the second feature may be a direct contact between the first and second features, or an indirect contact between the first and second features through an intermediate medium. Furthermore, the first feature being "on", "above" and "disposed on" the second feature may be that the first feature is directly above or diagonally above the second feature, or simply that the first feature is horizontally higher than the second feature. The first feature is "below", "under" and "underneath" the second feature may be that the first feature is directly below or diagonally below the second feature, or simply that the first feature is less horizontal than the second feature.

It is noted that when an element is said to be "fixed to" or "disposed on" another element, it may be directly on the other element or there may be a centered element. When an element is said to be "connected" to another element, it may be directly connected to the other element or there may be both centered elements. As used herein, the terms "vertical", "horizontal", "top", "bottom", "left," "right," and similar expressions are used herein for illustrative purposes only and are not intended to be the exclusive means of implementation.

In a foldable multi-layer storage system of the related art, a crossed folding support mechanism can be disposed between adjacent two plates. The crossed folding support mechanism occupies certain space between the adjacent two plates when the foldable multi-layer storage system is folded, so that the intermediate plate cannot completely fit with the adjacent two plates, making the storage system occupy a relatively great volume in the folded state. Thus, it occupies more space to store the storage system, and it is not convenient to convey the storage system and a packing cost of the storage system is high.

In view of above, referring to FIG. 1, FIG. 1 is a structural schematic diagram of a storage system 100 in a first embodiment of the present disclosure in a first using state. The present disclosure provides a storage system 100. The storage system 100 is generally used in the field of storing and conveying of tools. The storage system 100 can also be used in storing and conveying of other objects. The other objects include but are not limited to a packages, clothes, vegetables and the like.

Figure 2:
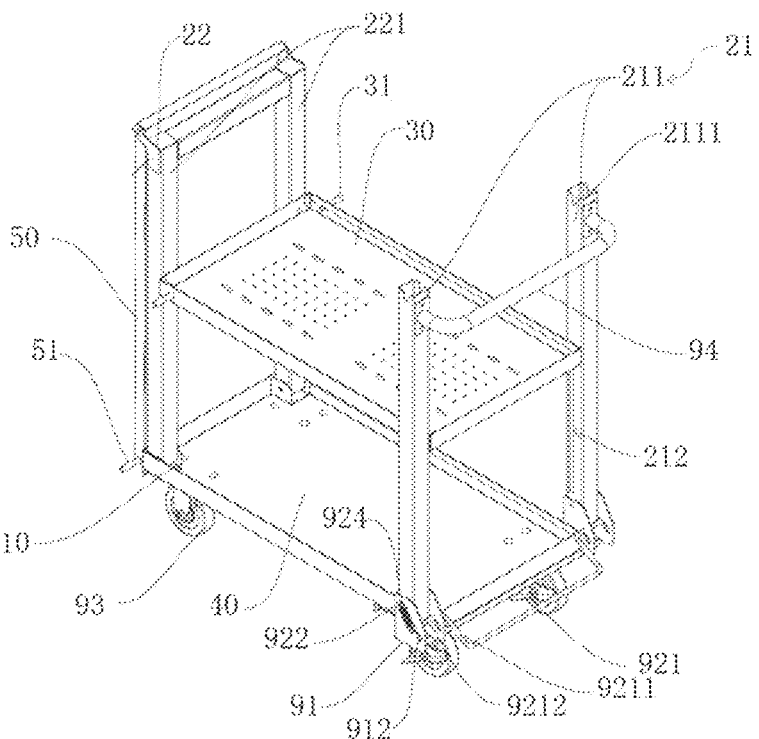
FIG. 2 is a structural schematic diagram of the storage system in FIG. 1 in one of the states.
Figure 3:
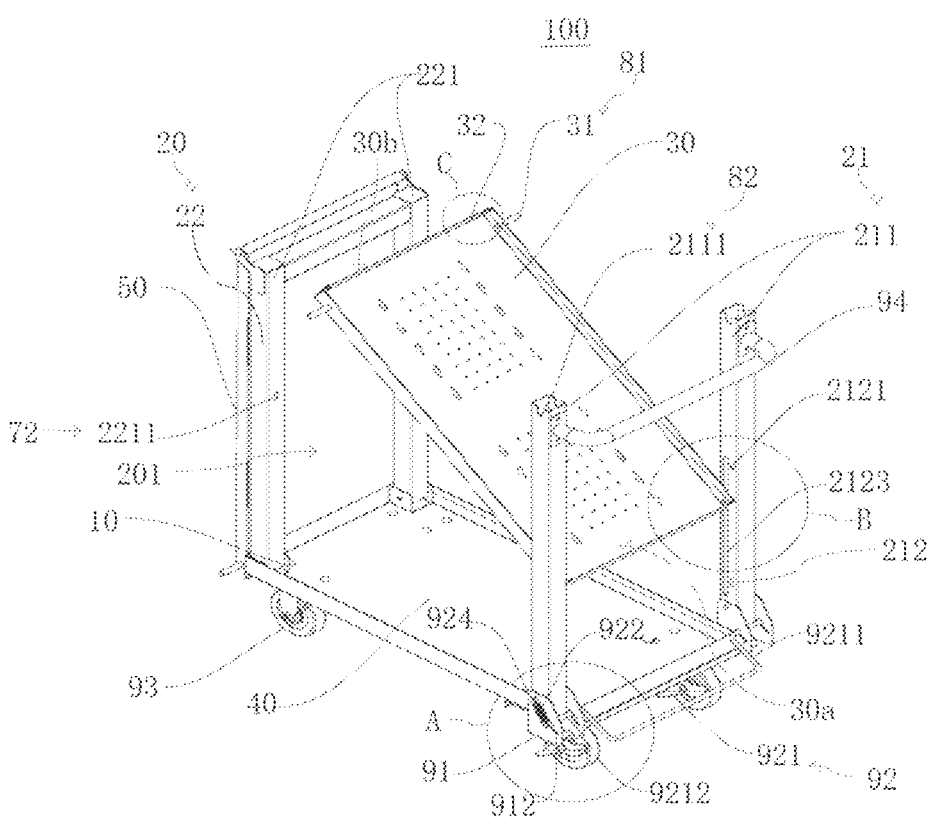
FIG. 3 is a structural schematic diagram of the storage system in FIG. 1 in one of the states.
Figure 4:
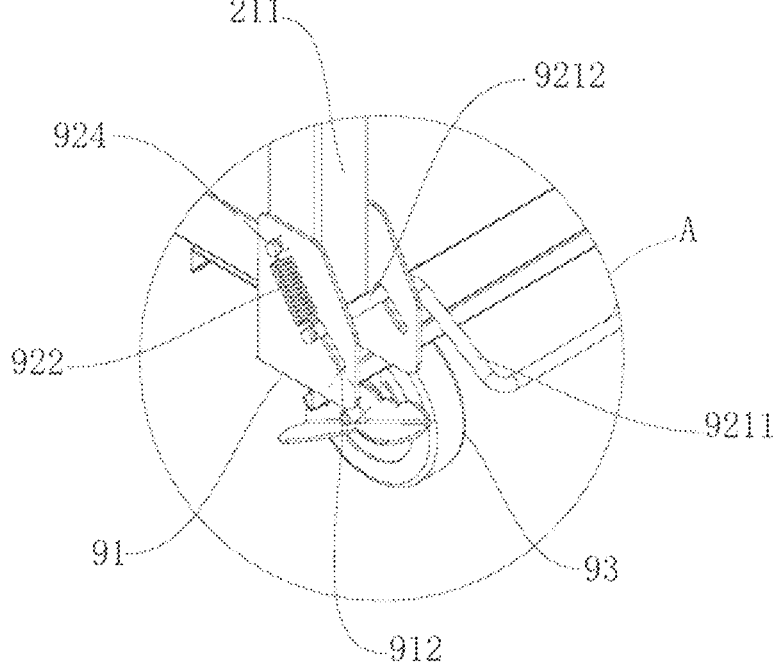
FIG. 4 is a partial enlarged figure of A portion in FIG. 3.
Figure 5:
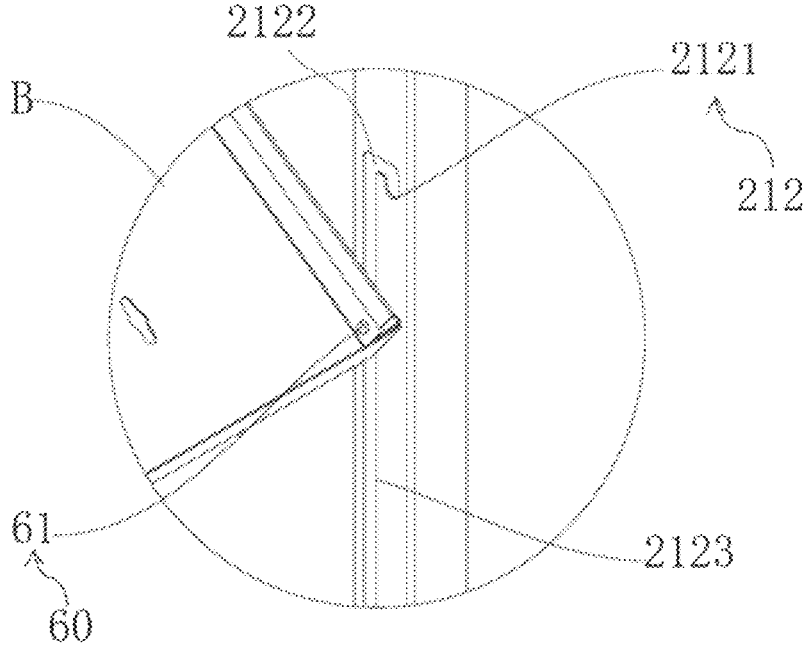
FIG. 5 is a partial enlarged figure of B portion in FIG. 3.
Figure 6:
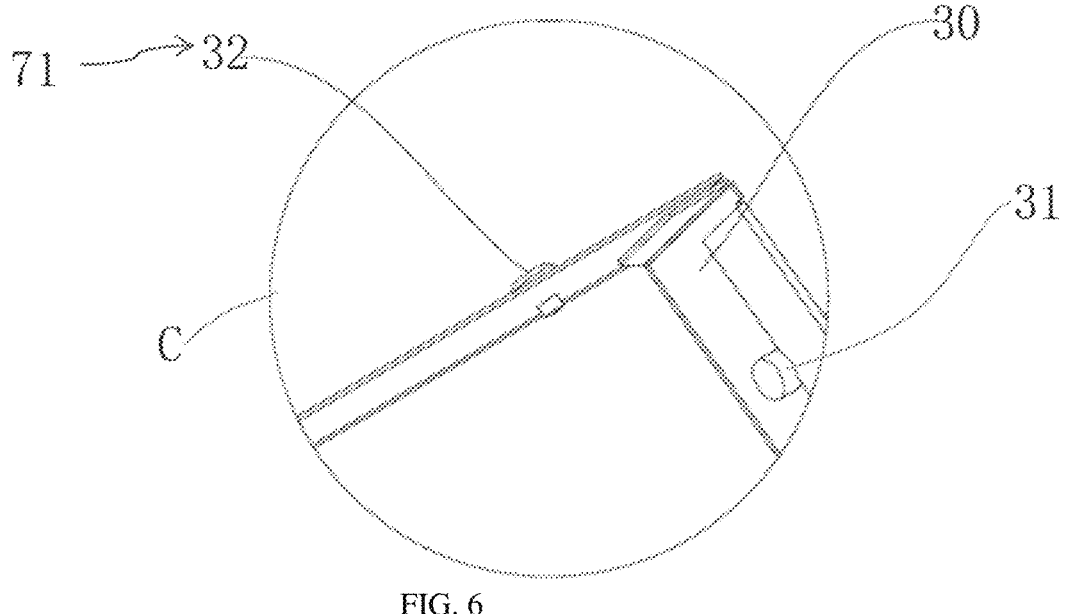
FIG. 6 is a partial enlarged figure of C portion in FIG. 3.
Figure 7:
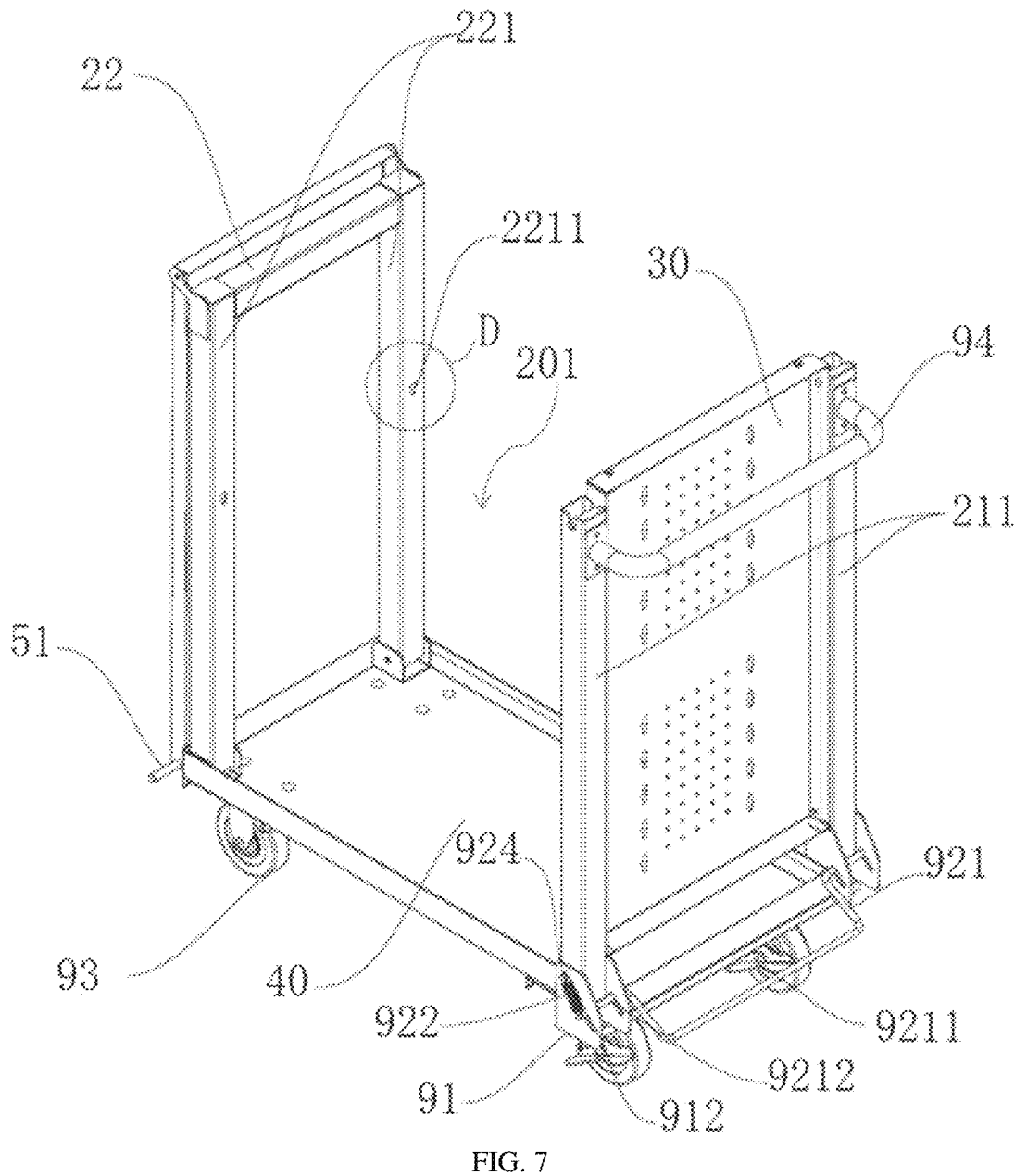
FIG. 7 is a structural schematic diagram of the storage system in FIG. 1 in one of the states.
Figure 8:
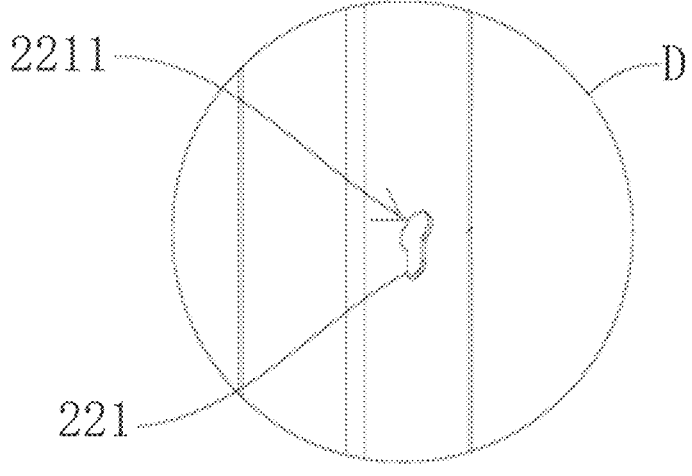
FIG. 8 is a partial enlarged figure of D portion in FIG. 7.
Figure 9:
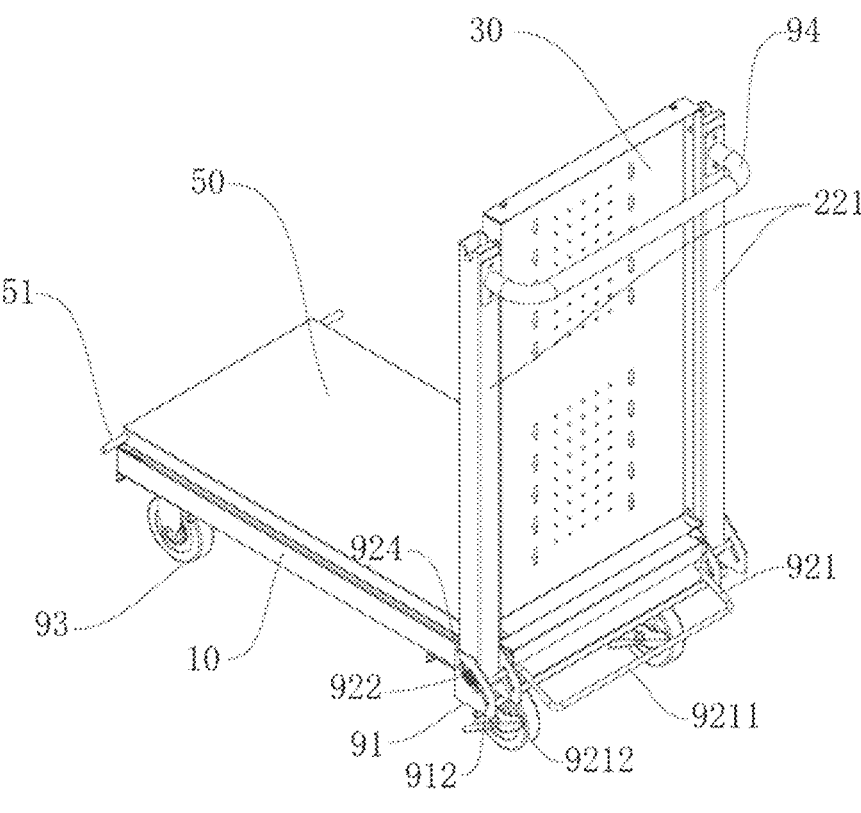
FIG. 9 is a structural schematic diagram of the storage system of the first embodiment in FIG. 1 in a second using state.
Figures 10, 11:
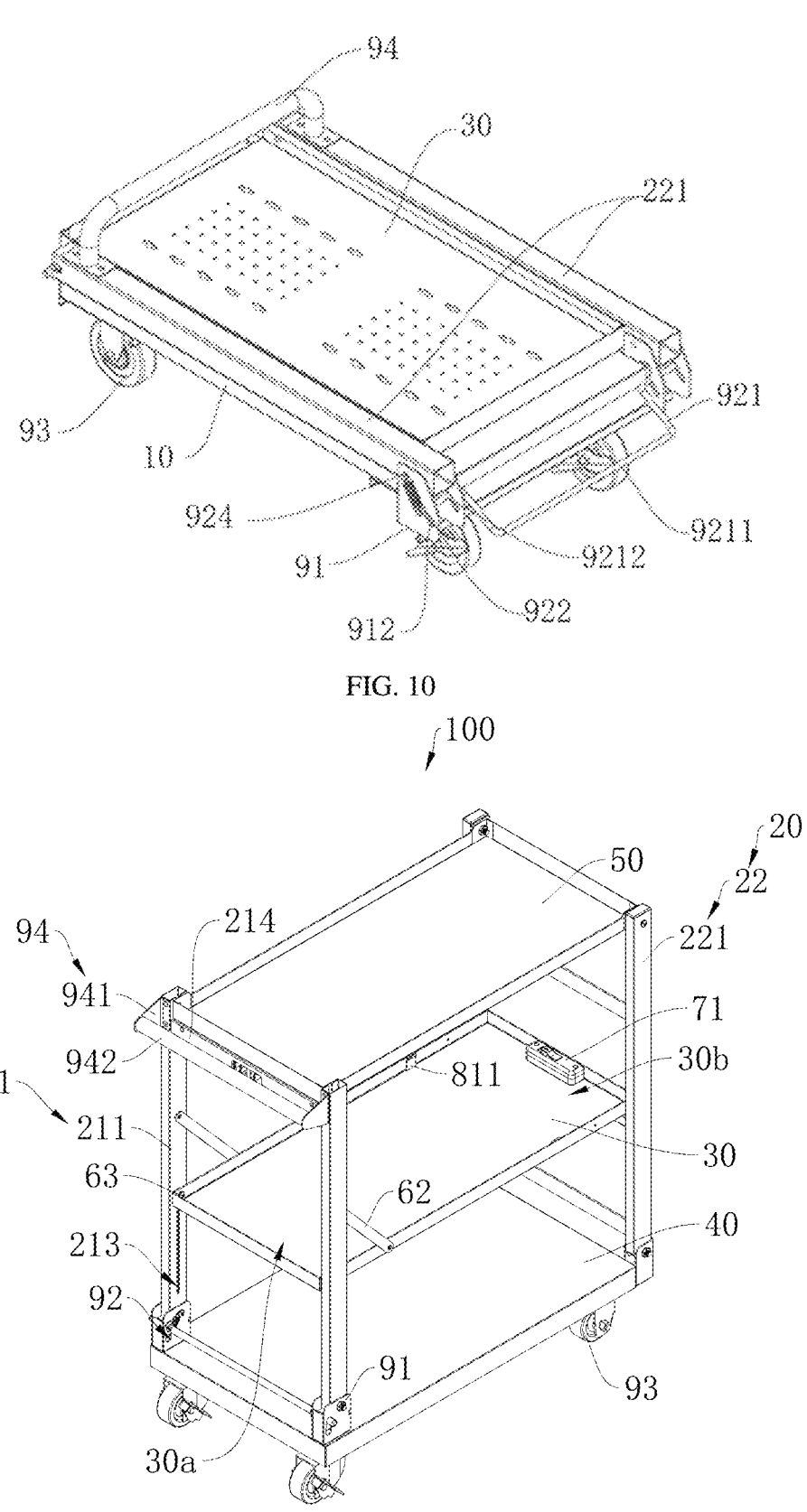
FIG. 10 is a structural schematic diagram of the storage system of the first embodiment in FIG. 1 in a folded state.
FIG. 11 is a structural schematic diagram of a storage system in a second embodiment of the present disclosure in a first using state.
Figures 12, 13:
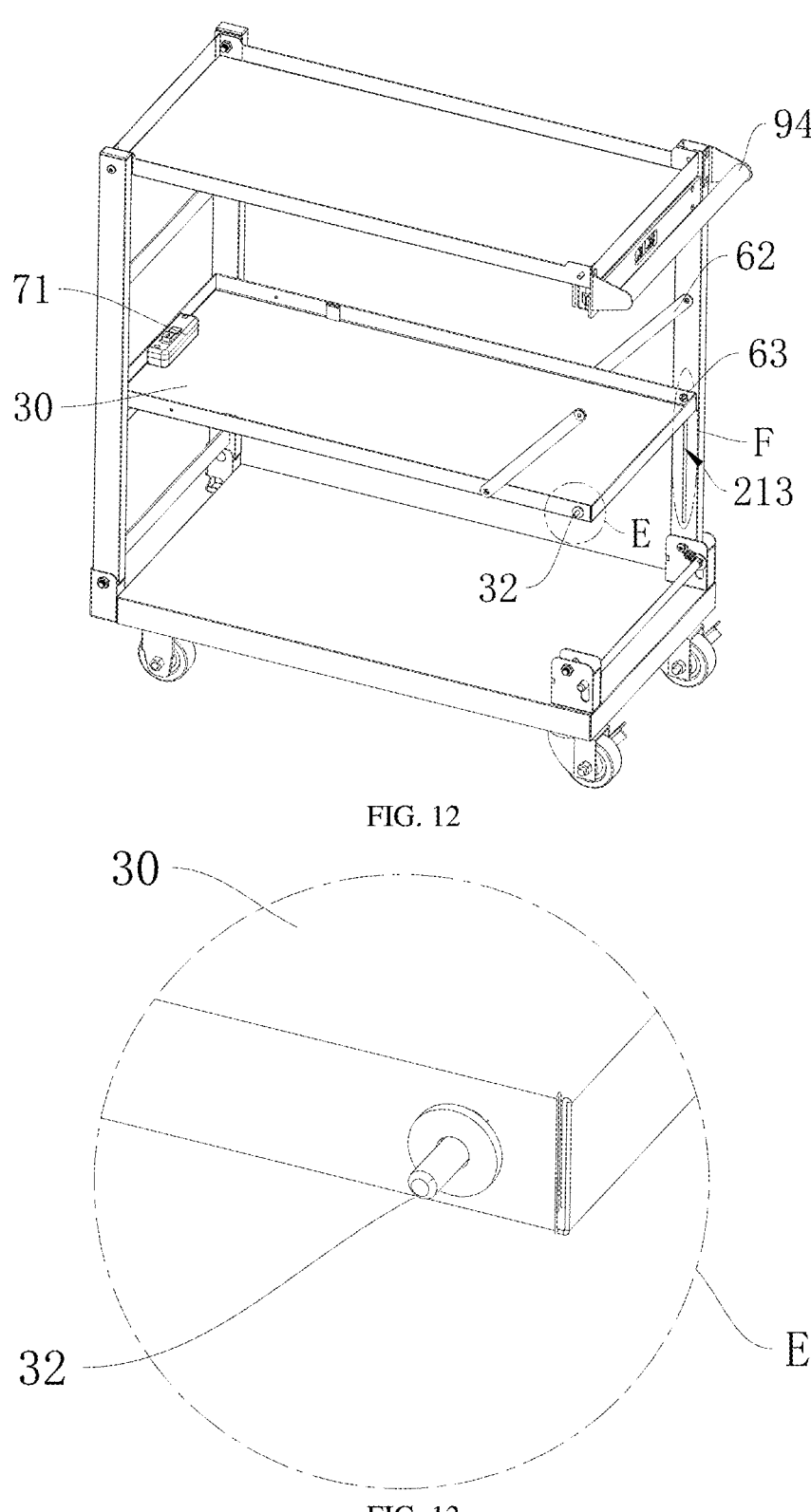
FIG. 12 is a partial structural schematic diagram of the storage system in FIG. 11.
FIG. 13 is a partial enlarged figure of E portion in FIG. 12.
Figure 14:
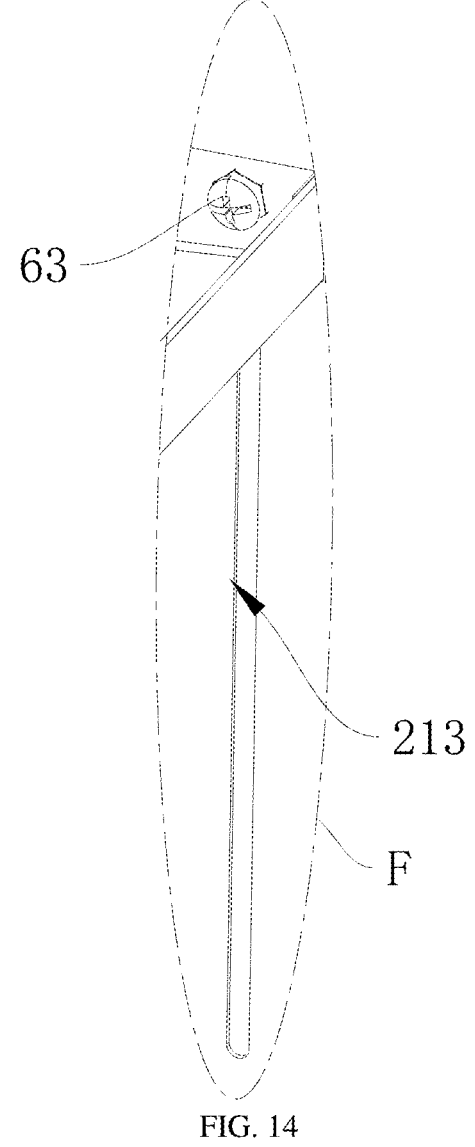
FIG. 14 is a partial enlarged figure of F portion in FIG. 12.
Figures 15, 16:
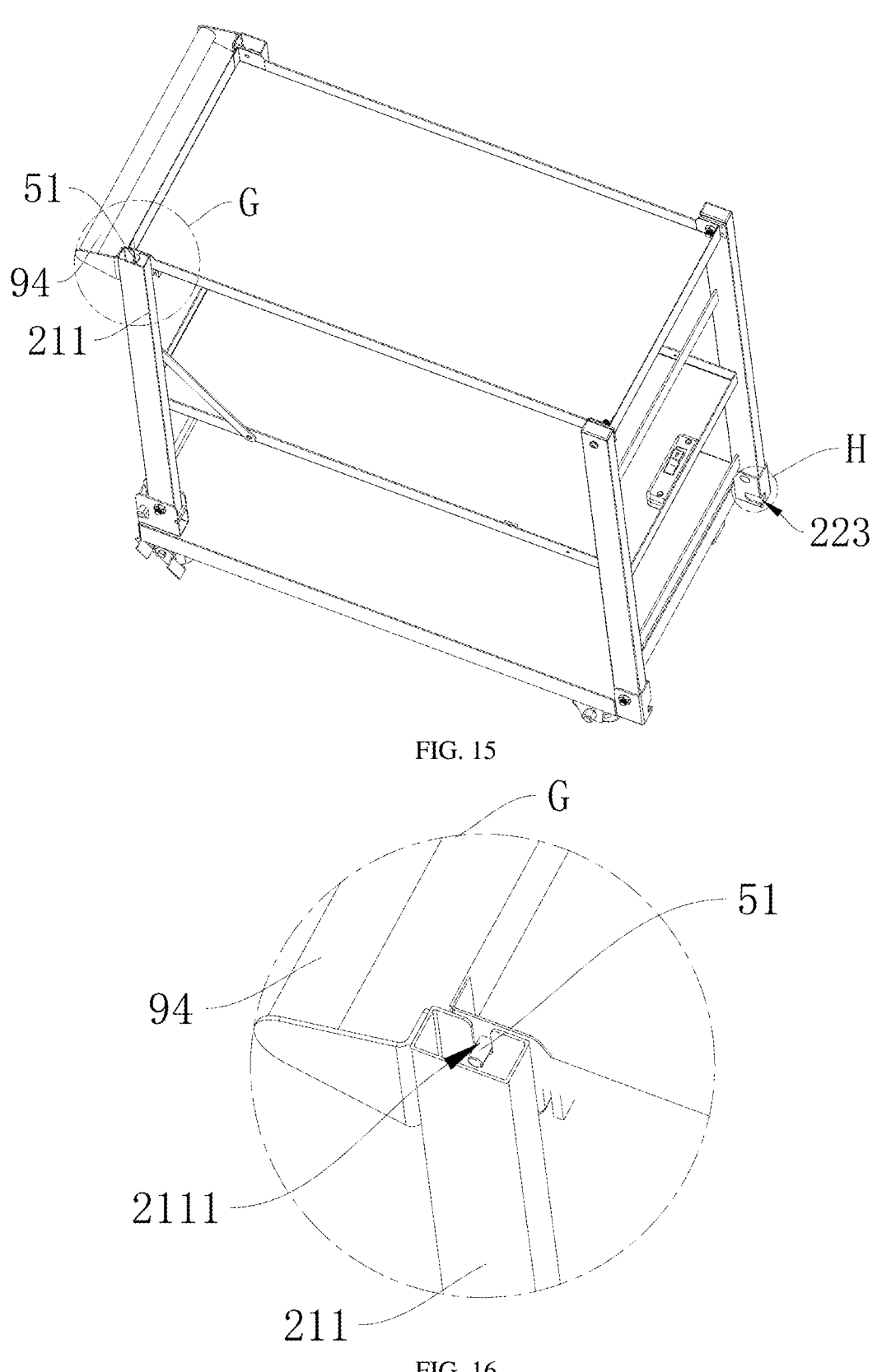
FIG. 15 is a structural schematic diagram of the storage system in FIG. 11 from another angle of view.
FIG. 16 is a partial enlarged figure of G portion in FIG. 15.

Referring to FIG. 1, and FIG. 2 to FIG. 10, FIG. 2 is a structural schematic diagram of the storage system 100 in FIG. 1 in one of the states; FIG. 3 is a structural schematic diagram of the storage system 100 in FIG. 1 in one of the states; FIG. 4 is a partial enlarged figure of A portion in FIG. 3; FIG. 5 is a partial enlarged figure of B portion in FIG. 3; FIG. 6 is a partial enlarged figure of C portion in FIG. 3; FIG. 7 is a structural schematic diagram of the storage system 100 in FIG. 1 in one of the states; FIG. 8 is a partial enlarged figure of D portion in FIG. 7; FIG. 9 is a structural schematic diagram of the storage system 100 of the first embodiment in FIG. 1 in a second using state; and FIG. 10 is a structural schematic diagram of the storage system of the first embodiment in FIG. 1 in a folded state.

The storage system 100 includes a chassis 10, a supporting frame 20 and at least one intermediate plates 30. The supporting frame 200 includes a plurality of first supporting rods 211 and a plurality of second supporting rods 221. The plurality of first supporting rods 211 and the plurality of supporting rods 221 are connected to the chassis 10 and rotatable relative to the chassis. The plurality of first supporting rods 211 are defined as a first folding mechanism 21. The plurality of second supporting rods 221 are defined as a second folding mechanism 22. The intermediate plate 30 is movably connected to the supporting frame 20.

The storage system 100 has a first using state and a folded state. When the storage system 100 is in the first using state, a first inclined angle $\alpha$ is defined between the plurality of first supporting rods 211 and the chassis 10, and a second inclined angle $\beta$ is defined between the plurality of second supporting rods 221 and the chassis 10, respectively. The at least one intermediate plate 30 is located at a middle of the supporting frame 20. The at least one intermediate plate 30 is capable of rotating until to a position adjacent to the first folding mechanism 21 and/or the second folding mechanism, so as to define a space 201 in the middle of the supporting frame 20. The intermediate pale 30 is further capable of rotating along with the first folding mechanism 21 and/or the second folding mechanism 22. The second folding mechanism 22 is capable of rotating until to a position adjacent to the chassis 10 through the space, and the first folding mechanism 21 is capable of rotating until to a position adjacent to the second folding mechanism 22, so that the storage system 100 is switched to the folded state.

In this way, the intermediate plate 30 of the storage system 100 provided by the present disclosure can be rotated to a position adjacent to the first folding mechanism 21 and/or the second folding mechanism 22, so as to define a space 201 between the middle of the supporting frame. Therefore, the first folding mechanism 21, the intermediate plate 30 and the second folding mechanism 22 can rotate via the space 201 and overlap with each other, so that the storage system 10 is capable of switching from the first using state to the folded state. In addition, in the folded state, all of the first folding mechanism 21, the intermediate plate 30 and the second folding mechanism 22 can successively or indirectly fit with the chassis 10, so that a total volume of the folded storage system 100 can be effectively reduced. Thus, the storage system 100 can maintain sufficient storage capacity in the first using state, and be convenient to store and convey in the folded state. Besides, a packing cost and a conveying cost of the storage system 100 can be lowered.

It could be understood that the first folding mechanism 21 and the second folding mechanism 22 can replace with each other, as long as using and folding of the storage system 100 are not affected.

It should be noted that the intermediate plate 30 is a plate disposed on the supporting frame 20 except the top plate and the bottom plate, and in not limited to the plate disposed right in the middle of the supporting frame 20. In addition, the middle of the supporting frame 20 represents the position between the top and the bottom of the supporting frame 20, and is not limited to a position right in the middle of the supporting frame 20.

As an example, referring to FIG. 1 to FIG. 10 and FIG. 48, in a first embodiment of the present disclosure, the storage system 100 can include an intermediate plate 30. The chassis 10 can be provided with a bottom plate 40. The top of the supporting frame 20 can be provided with a top plate 50. In some embodiments, all of the bottom plate 40, the intermediate plate 30 and the top plate 50 can be in rectangle-shaped.

An end of the top plate 50 can be rotatably connected to the second folding mechanism 22, the other end of the top plate 50 can be detachably connected to top of the first folding mechanism 21.

Referring to FIG. 1 and FIG. 2, in the process that the storage system 100 is switched form the first using state to the folded state, the top plate 50 can overturn outwards to the outside of the second folding mechanism 22. The outside of the second folding mechanism 22 is a side of the second folding mechanism 22 away from the first folding mechanism 21. In other words, the top plate 50 can rotate to a side of the second folding mechanism 22 away from the first folding mechanism 21, and the overturned top plate 40 can be overlapped with the second folding mechanism 22.

It could be understood that in other embodiments, when the storage system 100 is switched from the first using state to the folded state, the top plate can be overturned inwards to the inside of the second folding mechanism 22. Specifically, the top plate 50 can be lifted to a certain height, and then the intermediate plate 30 can be overturned and moved to a position adjacent to the first folding mechanism 21 to define a space 201. Then the top plate 50 can be rotate to the inside of the second supporting rod 221.

It should be noted that in the present embodiment, all of a length of the first supporting rod 211, a width of the first supporting rod 211 and a width of the first supporting rod 211 are the same with those of the second supporting rod 221. A distance between two first supporting rods 211 is equal to that between two second supporting rods 221.

Furthermore, referring to FIG. 3 and FIG. 5, the storage system 100 can further include a connecting structure 60. The intermediate plate 30 can be rotatably connected to the first supporting rod 211 via the connecting structure 60. The intermediate plate 30 can have a first end 30a and a second end 30b away from each other. The first end 30a of the intermediate plate 30 can rotate to a bottom end of the first folding mechanism 21 via the connecting structure 60. The second end 30b of the intermediate plate 30 can rotate to a top end of the first folding mechanism.

Referring to FIG. 1 to FIG. 10, in the first embodiment of the present disclosure, the connecting structure 60 can include two first sliders 61. The two first sliders 61 can protrude from two sides of the first end 30a of the at least one intermediate plate 30, respectively, and the two sides of the first end 30a of the at least one intermediate plate 30 can be away from each other. The number of the plurality of first supporting rods 211 can be two. Each sidewall of the two first supporting rods 211 can be provided with a first sliding channel 212, respectively. The first sliding channel 212 can extend along an axis of the first supporting rod 211, and the two first sliders 61 can extend into the first sliding channel 212, respectively, and be capable of sliding along the first sliding channel 212.

Furthermore, the first sliding channel can include a positioning section 2121, a transitional section 2122 and a sliding section 2123, which can be successively connected with each other. Both the positioning section 2121 and the transitional section 2122 can be located at the top of the sliding section 2123. The sliding section 2123 can be located on a side of two first supporting rods 211 adjacent to the bottom of the two first supporting rods 211, and a length of the sliding section 2123 is greater than a length of the positioning section 2121. When the at least one intermediate plate 30 is located in the middle of the supporting frame 20, the two first sliders 61 can be located in the positioning section 2121. The two first sliders 61 are capable of sliding to the sliding section 2123 via the transitional section 2122, and allowing the first end 30a of the at least one intermediate plate 30 to slide to the bottom end of the first folding mechanism 21. In this way, the first end 30a of the intermediate plate can turn the intermediate plate 30 from a horizontal direction to a vertical direction and move to a position adjacent to the first folding mechanism 21 and fit with the first folding mechanism by merely changing a position of the first slider 61 on the first sliding channel 212.

It should be noted that in the present embodiment, the first sliding channel 212 is in inverted hook-shaped. Both the sliding section 2123 and the positioning section 2121 can extend along a length direction of the first supporting rod 311. The transitional section 2122 can extend along a width direction of the first supporting rod 211, and configured to connect the sliding section 2123 with the positioning section 2121.

Furthermore, in the first using state, both the sliding section 2123 and the positioning section 2121 can be perpendicular to the chassis 10, and the transitional section 2122 can be parallel to the chassis 10. A side of the transitional section 2122 adjacent to the chassis 10 can be arc-shaped, so as to improve smoothness of the first slider 61 sliding through the transitional section 2122, thereby improving a rate of folding or opening the intermediate plate 30.

It could be understood that in some embodiments, the number of the first sliders 61 at each side of the first end 30a of the intermediate plate 30 and the number of the first sliding channel 212 at each side of the first supporting rod 211 can be more than two to enhance a connecting strength between the intermediate plate 30 and the first folding mechanism 21, as long as switching between the different using states and the folding state of the storage system 100 is not affected.

Furthermore, referring to FIG. 3, FIG. 6, FIG. 7 and FIG. 8, the storage system can further include a first clamping structure 71 and a second clamping structure 72. The first clamping structure 71 can match with the second clamping structure 72 and be detachably connected with the second clamping structure 72. One of the first clamping structure 71 and the second clamping structure 72 can be disposed on the at least one intermediate plate 30, the other of the first clamping structure 71 and the second clamping structure 72 can be disposed on the second folding mechanism 22.

When the storage system 100 is in the first using state, the first clamping structure 71 and the second clamping structure 72 can be clamped to and fixed with each other, so that the at least one intermediate plate 30 can be fixed in the middle of the supporting frame 20.

Furthermore, when the storage system 100 is in the first using state, a side of the at least one intermediate plate 30 towards the second folding mechanism 22 can be provided with a second protrusion 32 and the second protrusion 32 can be defined as the first clamping structure 71, and a side of the second supporting rod 221 towards the at least one intermediate plate 30 can be provided with a positioning hole 2211 and the positioning hole 2211 can be defined as the second clamping structure 72. When the storage system 100 is switched from the first using state to the folded state, the second protrusion 32 can be capable of separating from the positioning hole 2211 along with rotation of the at least one intermediate plate 30. When the storage system 100 is switched from the folded state to the first using state, the second protrusion 32 can be capable of rotating and being clamped in the positioning hole 2211 along with the rotation of the at least one intermediate plate 30, so that the at least one intermediate plate 30 can be kept in the middle of the supporting frame 20.

It should be noted that, in the present embodiment, the first clamping structure 71 is the second protrusion 32, and the second clamping structure 72 is the positioning hole 2211. It could be understood that in other embodiments, when the storage system 100 is in the first using state, the second end 30b of the intermediate plate 30 can be fixed to the second folding mechanism 22 via other structures. For example, the second end 30b of the intermediate plate 30 can be locked to the second folding mechanism 22 via a locking member.

Referring to FIG. 3, FIG. 6, FIG. 7 and FIG. 8, furthermore, the positioning hole 2211 can be a gourd-shaped hole. When the storage system 100 is in the first using state, the positioning hole 2211 can include a first section and a second section. A diameter of the first section is greater than that of the second section. The second section is relatively adjacent to the chassis 10. In other words, when the storage system 100 is in the first using state, i.e., the state the storage system 100 is completely unfolded, two second protrusions 32 of the intermediate plate 30 can be clamped in the second section of the gourd-shaped hole, respectively. When the intermediate plate 30 should be folded to a position adjacent to the first folding mechanism 21, the two second protrusions 32 can move from the second section to the first section, the two first sliders 61 move from the positioning section 2121 of the two first sliding channels 212 to the direction of the chassis 10 through the transitional section 2122 along the sliding section 2123, so as to allow the two second protrusions 32 separating from the first sections. When the two first sliders 61 slides to the bottom of the sliding section 2123, the intermediate plate 30 can move adjacent to and fit with the first folding mechanism 21.

It could be understood that positions of the second protrusion 32 and the positioning hole 2211 can replace with each other, as long as the second protrusion 32 and the positioning hole 2211 can match to fix the intermediate plate 30.

Furthermore, referring to FIG. 1 to FIG. 3, the storage system 100 can further include a first positioning structure 81 and a second positioning structure 82. The first positioning structure 81 can match with the second positioning structure 82 and be detachably connected to the second positioning structure 82. One of the first positioning structure 81 and the second positioning structure 82 can be disposed on the at least one intermediate plate 30, and the other of the first positioning structure 81 and the second positioning structure 82 is disposed on the first folding mechanism 21. The first positioning structure 81 can be capable of clamping to and fixing with the second positioning structure 82, so that the at least one intermediate plate 30 can be capable of rotating to a position adjacent to the first folding mechanism 21 and being fixed to the first folding mechanism 21.

Referring to FIG. 3 and FIG. 6, in the present embodiment, the first positioning structure 81 can include a first protrusion 31. The first protrusion 31 can be disposed on a side edge of the second end 30b of the at least one intermediate plate 30. The second positioning structure 82 can include a first groove 2111. The first groove 2111 can be provided on the top of the first supporting rod 211. When the second end 30b of the at least one intermediate plate 30 rotates to a position adjacent to the top of the first supporting rod 211, the first protrusion 31 can be capable of clamping in the first groove 2111. It could be understood that the first protrusion and the first groove 2111 can be disposed at other positions on the intermediate mechanism 21 and the first supporting rod 211, as long as the intermediate plate 30 can fixed to the first folding mechanism 21 after the intermediate plate 30 is rotated to the position adjacent to the first folding mechanism 21. For example, a rotated L-shaped fixing sliding slot 715 can be provided on a side wall of the first supporting rod 211. The first protrusion 31 can enter a horizontal section of the fixing sliding slot 715 from a side of the fixing sliding slot 715 and clamped to a vertical section of the fixing sliding slot 715. It could be understood that the number of the first protrusions 31 and the number of the first grooves 2111 can be adjusted according to actual needs, and are not limited herein. Furthermore, in some embodiments, positions of the first protrusion 31 and the first groove 2111 can be replaced, as long as the intermediate plate 30 can be fixed to the first folding mechanism 21.

In the present embodiment, a length of the intermediate plate 30 can be equal to or a little greater than that of the first supporting rod 211. Therefore, the first protrusion 31 can be conveniently clamped in the first groove 211 while an accommodating length of the intermediate plate 30 is guaranteed. It could be understood that in some embodiments, the length of the intermediate plate 30 can be freely defined according to actual needs. A position of the first groove 2111 on the first protrusion 31 can be adjusted according to the length of the intermediate plate 30 and the length of the first supporting rod 211.

Furthermore, it could be understood that in some embodiments, the intermediate plate 30 can be fixed to the first folding mechanism 21 via other structures. For example, the intermediate plate 30 can be locked to the first folding mechanism 21 via a locking member.

Referring to FIG. 1, it should be noted that in the present embodiment, two sidewalls of an end of the top plate 50 configured to connect to the first folding mechanism 21 can be further provided with two third protrusions 51. When the storage system 100 should be switched from the folded state to the first using state, the two third protrusions 51 can be able to be clamped in the two first grooves 2111 at the top end of the first folding mechanism 21, respectively, making the top plate 50 stably supported by the first folding mechanism 21.

Referring to FIG. 3 and FIG. 4, furthermore, the storage system 100 can further include a support 91. The support 91 is fixed to the chassis 10. The first folding mechanism 21 can be rotatably connected to the support 91, and a height of the support 91 can match with a thickness of the second folding mechanism 22. When the storage system 100 is in the folded state, the second folding mechanism 22 can be capable of rotating until to a position parallel to the chassis 10 and being in contact with the chassis 10, and the first folding mechanism 21 can be capable of rotating until to a position parallel to the second folding mechanism 22 and being in contact with the second folding mechanism 22. It could be understood that in some embodiments, when a thickness of the intermediate plate 30 and/or a thickness of the top plate 50 is greater than that of the second folding mechanism 22, a height of the support 90 can be increased accordingly. Furthermore, it could be understood that when the number of the intermediate plate 30 is added, the height of the support 91 can match with the thickness of the second folding mechanism 22, the thickness of the top plate 50 and/or the thickness of the intermediate plate 30.

It could be understood that in some embodiments, when the number of the intermediate plate 30 is two, one of the two intermediate plates 30 can move towards the first folding mechanism 21, the other of the two intermediate plates 30 can move towards the second folding mechanism 22. Specifically, the top plate 50 can be turned outwards to a position adjacent to a side of the second folding mechanism 22 away from the first folding mechanism 21, and then the second ends 30b of the two intermediate plates 30 can be detached from the first folding mechanism 21 and the second folding mechanism 22, respectively. In addition, the two intermediate plates 30 can be rotated to positions adjacent to and fit with the first folding mechanism 21 and the second folding mechanism 22, respectively. Therefore, the second folding mechanism 22 and the first folding mechanism 21 can be successively rotated towards the chassis 40 until the storage system 100 is switched from the first using state to the folded state.

It could be understood that in some embodiments, after the added intermediate plate 30 is rotated to the position adjacent to and fit with the second folding mechanism 22, the added intermediate plate 30 can be located between the two second supporting rods. Besides, the added intermediate plate 30 should not protrude out from the second folding mechanism 22, so that the height of the supporting 91 can still match with the thickness of the second folding mechanism 22.

Furthermore, referring to FIG. 3 and FIG. 4, the storage system 100 can further include a locking structure 92. The locking structure 92 can be mounted on the support 91. The locking structure 92 can have a first locking state, a second locking state and an unlocking state. When the locking structure 92 is in the first locking state, the locking structure 92 is capable of keeping the first folding mechanism 21 in the first using state. When the locking structure 92 is in the second locking state, after the first folding mechanism 21 folds and rotates to a position adjacent to the second folding mechanism 22, the locking structure 92 is capable of fixing the first folding mechanism 21. When the locking structure 92 is in the unlocking state, the locking structure 92 is capable of allowing the first folding mechanism 21 to rotate.

It is understood that in the first using state, the first folding mechanism 21 can be perpendicular to the chassis 10. Of course, in the first using state, an angle defined between the first folding mechanism 21 and the chassis 10 can also be in other degrees, which is not limited herein.

Alternatively, a side of the support 91 adjacent to the second folding mechanism 22 can be provided with a first abutting block 911. A side of the support 91 away from the second folding mechanism 22 can be provided with a sliding groove 912. A second abutting block 215 protruding from the first supporting rod 211 can be provided. The locking structure 92 can include a foot rest lever 921 and a third elastic member 922. The foot rest lever 921 is capable of sliding in the sliding groove 912, and the third elastic member 922 can be connected to the foot rest lever 921 and capable of elastically acting on the foot rest lever 921. When the locking structure 92 is in the first locking state, the foot rest lever 921 can abut against the second abutting block 215 under elastic action of the third elastic member 922, and a side of the first supporting rod 211 away from the second abutting block 215 can abut against the first abutting block 911. When the locking structure 92 is in the second locking state, the foot rest lever 921 can abut against the side of the first supporting rod 211 away from the second abutting block 215 under the elastic action of the third elastic member 922. It could be understood that the locking structure 92 can be switched from the second locking state to the first locking state merely by rotating the first folding mechanism 21 to a roughly vertical state.

Furthermore, the first supporting rod 211 can be rotatably connected to the support 91 via a rotating shaft 924 protruding from the support 91. An end of the third elastic member 922 can be sleeved on the rotating shaft 924 and the other end of the third elastic member 922 can be sleeved on the foot rest lever 921. In this way, a rotating fulcrum of the first supporting rod 211 can be provided by the rotating shaft 924, so that the first supporting rod 211 can be more stable and less prone to skew when rotates. In addition, a position of the first folding mechanism 21 can be guaranteed to be relatively fixed after rotation. Therefore, the position of the first folding mechanism 21 can be kept correspondingly to a position of the second folding mechanism 22.

Furthermore, it is understood that, as long as a role of the locking structure 92 is not affected, the foot rest lever 921 can be a linear rod or include a partial bending section. In some embodiments, the foot rest lever 921 can include a concave section 9211, and two ends of the concave section 9211 can extend outside to form a linear section 9212, respectively. Two linear sections 9212 can slide within two sliding grooves 912, respectively, and the third elastic member 922 can be connected to the linear section 9212. The concave section 9211 makes it easier for a user to step on to control the foot rest lever 921 to slide in the sliding groove 912.

Furthermore, in the present embodiment, an inclined angle can be defined between an extending direction of the sliding groove 912 and the bottom plate 40, and an inclined angle can be defined between the concave section 9211 and the bottom plate 40, which are convenient for the user to apply a force on the foot rest lever 921 to switch the foot rest lever 921 to the unlocking state. It is understood that, in other embodiments, the extending direction of the sliding groove 912 may be perpendicular to the bottom plate 40 or perpendicular to the chassis 10, and a shape of the foot rest lever 921 may be varied as required, as long as the role of the locking structure 92 is not affected.

Furthermore, referring to FIG. 1, the storage system 100 can further include a plurality of wheels 93, and the plurality of wheels 93 can be disposed at the bottom of the bottom plate 40. Furthermore, the storage system 100 can further include a push-pull member 94, and the push-pull member 94 can include a connecting member 941 and a handle 942. The handle 942 can be connected to the first folding mechanism 21 via the connecting member 941. It is understood that the connecting member 941 and the handle 942 can be integrally formed or separately formed.

Alternatively, in the present embodiment, the connecting member 941 and the handle 942 can be integrally formed. An inclined angle can be formed between the connecting member 941 and the handle 942, so that a distance can be defined between the handle 942 and the first folding mechanism 21, which is convenient for the user to hold the handle 942 and push and pull the storage system 100. It is understood that, the number of the wheel 93 is not limited herein, as long as the wheel 93 can facilitate a movement of the storage system 100.

Furthermore, the wheel 93 can be a universal wheel with a locking structure. The universal wheel can facilitate flexible steering of the storage system 100. Moreover, it can be guaranteed by the locking structure of the universal wheel that the storage system 100 can be less prone to move at a required position.

Furthermore, referring to FIG. 3 and FIG. 9, the storage system 100 can have a second using state. The at least one intermediate plate 30 is capable of rotating until to a position adjacent to the first folding mechanism 21 and being fixed to the first folding mechanism 21. In the second using state, the storage system 100 can be in L-shaped. Specifically, the two first protrusions 31 disposed at both sides of second ends 30*b* of the at least one intermediate plate 30 can be clamped to the two first grooves 2111 at the top end of the two first supporting rods 211, respectively, thereby fixing the at least one intermediate plate 30 at the position adjacent to the first folding portion 21. Then the top plate 50 can be overturned to the outside of the second folding mechanism 22, and then the top plate 50 can rotate along with the second folding mechanism 22 until to the position adjacent to the chassis 10. In this way, the storage system 100 can be kept in the second using state, thus forming an L-shaped cart structure. In the second using state, a cargo with a great volume or height can be pushed and pulled by the storage system 100.

Figures 42, 43:
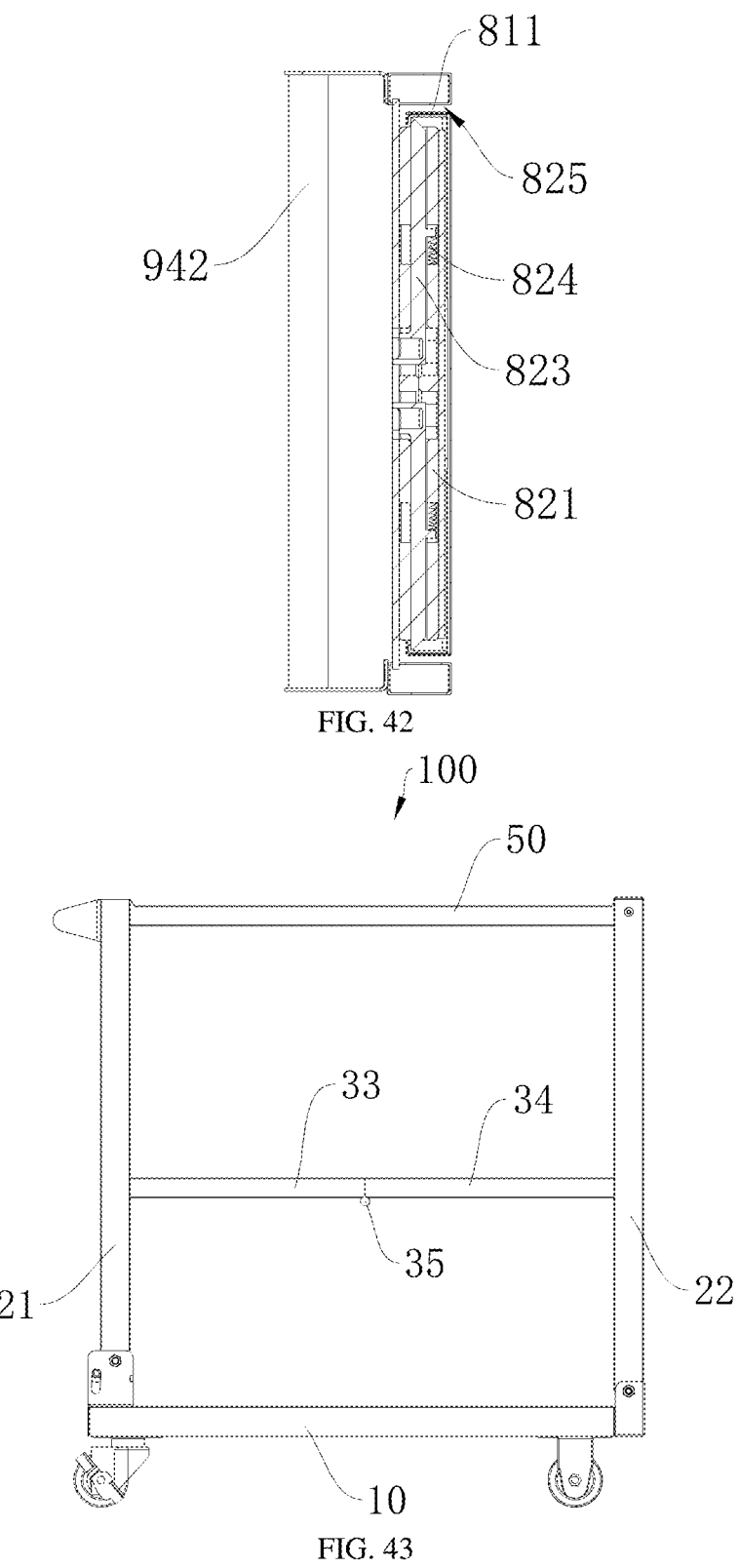
FIG. 42 is a structural schematic diagram of the storage system in FIG. 41 along a section A-A.
FIG. 43 is a structural schematic diagram of a storage system in a fifth embodiment of the present disclosure in a first using state.

Furthermore, referring to FIG. 11 and FIG. 42, the present disclosure can further provide a second embodiment. An inventive concept and parts of the structure of the second embodiment are the same as those of the first embodiment, and differences between the second embodiment and the first embodiment are as follows.

In the second embodiment, referring to FIG. 11, the connecting structure 60 can include two articulated rods 62, and both ends of each of the two articulated rods 62 can be pivotally connected to the at least one intermediate plate 30 and the first supporting rod 211, respectively. When the storage system is in the first using state, a third inclined angle γ is defined between the articulated rod 62 and the intermediate plate 30, and a fourth inclined angle δ is defined between the articulated rod 62 and the supporting rod 211.

Furthermore, second sliders 63 protruding from two sides of the first end 30*a* of the at least one intermediate plate 30 can be provided, and the two sides of the first end 30*a* of the at least one intermediate plate 30 can be away from each other. The number of the plurality of the first supporting rods 211 can be two. Sidewalls of the two first supporting rods 211 can be provided with a second sliding channel 213, respectively, and the sidewalls of the two first supporting rods 211 can be opposite to each other. The two second sliding channels 213 can extend along an axis of the first supporting rod 211, and the two second sliders 63 can extend into the two second sliding channels 213, respectively, and are capable of sliding along the two second sliding channels 213, respectively. In this way, the second sliding channel 213 can match with the second slider 63 and play a role of guiding, which is convenient for the at least one intermediate plate 30 to rotate until to the position adjacent to the first folding mechanism 21. Specifically, after the second end 30*b* of the at least one intermediate plate 30 is detached from the second folding mechanism 22, the second slider 63 of the first end 30*a* of the at least one intermediate plate 30 can slide down along the second sliding channel 213. In this way, the at least one intermediate plate 30 can rotate to the position adjacent to the first folding mechanism 21 and descend at the same time, so that the second end 30*b* of the at least one intermediate plate 30 can be adjacent to an end of the first folding mechanism 21 away from the chassis 10 to the greatest extent after the at least one intermediate plate 30 and the first folding mechanism 21 are adjacent to each other, thus avoiding inconvenience caused by the second end 30*b* of the at least one intermediate plate 30 protruding too much from first folding mechanism 21. It is understood that the length of the at least one intermediate plate 30 can be provided as required, and the length of the at least one intermediate plate 30 can be greater than, equal to, or less than the length of the first supporting rod 211. However, when the length of the at least one intermediate plate 30 is greater than the length of the first supporting rod 211, a height of the second end 30*b* of the at least one intermediate plate 30 can be greater than that of the top of the first supporting rod 211 after the at least one intermediate plate 30 rotates to the position adjacent to the first folding mechanism 21.

In the first using state, the first end 30*a* of the at least one intermediate plate 30 can be suspended and fixed by the two articulated rods 62. Therefore, in the present embodiment, the second sliding channel 213 can include the sliding section 2123. An extending direction of the second sliding channel 213 can be the same as an extending direction of a first supporting rod, and the second sliding channel 213 can be perpendicular to the chassis 10.

Furthermore, referring to FIG. 11, and FIG. 18 to FIG. 22, in the present embodiment, the second folding mechanism 22 can include a first connecting rod 222. The first connecting rod 222 can be fixed between two second supporting rods 221 and in the middle of the supporting frame 20, and the second clamping structure 72 can be disposed on the first connecting rod 222.

Alternatively, in the present embodiment, the second clamping structure 72 can match with and be locked with the first clamping structure 71.

In some embodiments, the first clamping structure 71 can include a first pedestal 711, a first switch 712, a first clamping member 713 and a first elastic member 714. The first pedestal 711 can be fixed to the at least one intermediate plate 30, the first pedestal 711 can be provided with a bar-shaped sliding slot 715, and the first switch 712 can extend into the sliding slot 715 and be capable of sliding in the sliding slot 715. Both the first switch 712 and the first elastic member 714 can be accommodated in the first pedestal 711. The first switch 712 can be fixed to the first clamping member 713, one end of the first elastic member 714 can abut against an inner wall of the first pedestal 711, and the other end of the first elastic member 714 can be capable of elastically acting on the first clamping member 713. The second clamping structure 72 can include a second clamping member 721, and the second clamping member 721 can be fixed to the first connecting rod 222. The first clamping member 713 is capable of moving along with the first switch 712, and the first clamping member 713 and the first switch 712 are capable of moving away from the second clamping member 721, resulting in the first camping member 713 separating from and being unlocked with the second clamping member 721. Under the action of the first elastic member 714, the first clamping member 713 is capable of recovering, and being clamped to and locked with the second clamping member 721. In this way, when the first clamping member 713 is clamped to and locked with the second clamping member 721, the at least one intermediate plate 30 can be horizontally fixed between the first folding mechanism 21 and the second folding mechanism 22. When the first camping member 713 is separated from and unlocked with the second clamping member 721, the at least one intermediate plate 30 can be detached from the second folding mechanism 22 and rotate until to the position adjacent to the first folding mechanism 21.

It is understood that, in other embodiments, the first elastic member 714 may be replaced by a switch, and the second clamping member 721 may be disposed on the second supporting rod 221, as long as the second clamping member 721 is capable of matching with the first clamping member 713 to connect the at least one intermediate plate 30 to the second folding mechanism 22.

Furthermore, in the present embodiment, the first folding mechanism 21 can include a second connecting rod 214. The second connecting rod 214 can be fixed between the two first supporting rods 211 and located at the top end of the supporting frame 20, and the second positioning structure 82 can be disposed on the second connecting rod 214.

Alternatively, referring to FIG. 18, FIG. 19, FIG. 33, FIG. 37, FIG. 38, FIG. 40 and FIG. 42, in the present embodiment, the first positioning structure 81 can include a third clamping member 811, and the second positioning structure 82 can include a second pedestal 821, a second switch 822, a fourth clamping member 823 and a second elastic member 824. The second pedestal 821 can be fixed to the second connecting rod 214, and a slit 825 can be defined between the first supporting rod 211 and the second pedestal 821. The second switch 822 and the fourth clamping member 823 can be mounted on the second pedestal 821 and capable of moving relative to the second pedestal 821. The second elastic member 824 can be configured to elastically act on the second switch 822 or the fourth clamping member 823. The fourth clamping member 823 can be capable of extending out from the second pedestal 821 and extending into the slit 825. When the at least one intermediate plate 30 rotates to the position adjacent to the first folding mechanism 21, the third clamping member 811 can be capable of entering into the slit 825. The fourth clamping member 823 can be capable of moving along with the second switch 822 and the fourth clamping member 823 and the second switch 822 are capable of moving away from the third clamping member 811, resulting in the third clamping member 811 separating from and being unlocked with the fourth clamping member 823. Under the elastic action of the second elastic member 824, the fourth clamping member 823 is capable of recovering, and being clamped to and locked with the third clamping member 811.

In other words, in the present embodiment, the at least one intermediate plate 30 can be fixed to the first folding mechanism 21 in a way of being locked after the intermediate plate 30 moves to the position adjacent to the first folding mechanism 21. In this way, the at least one intermediate plate 30 can be securely and safely fixed to the first folding mechanism 21. Moreover, a limit of the length of the at least one intermediate plate 30 can be reduced. Regardless of how much the first end 30a of the at least one intermediate plate 30 protruding from the first folding mechanism 21, the second positioning structure 82 is required to be disposed on a position of the at least one intermediate plate 30 corresponding to the first positioning structure 81.

It is understood that, in other embodiments, the second elastic member 824 may be replaced by a switch for position limitation. It is understood that the second positioning structure 82 may be disposed on the first supporting rod 211, as long as the at least one intermediate plate 30 is fixed on the inside of the first folding mechanism 21.

It is understood that, in other embodiments, the slit 825 may not be provided between the second pedestal 821 and the first supporting rod 211, as long as a relationship of position limitation can be formed between the third clamping member 811 and the fourth clamping member 823 and the third clamping member 811 and the fourth clamping member 823 can be clamped and locked with each other.

It should be noted that, in an embodiment, the relationship of position limitation can be formed between the third clamping member 811 and the fourth clamping member 823, and the relationship of position limitation can be formed on both side of the at least one intermediate plate 30. In other embodiments, the relationship of position limitation may be formed on one side of the at least one intermediate plate 30. In other embodiments, the fourth clamping member 823 can protrude from the middle of an end of the at least one intermediate plate 30, and the third clamping member 811 can be disposed in the middle of the second connecting rod 214 corresponding to the fourth clamping member 823.

Referring to FIG. 38 to FIG. 42, when the storage system 100 is in the first using state, the fourth clamping member 823 can extend into the slit 825. When the storage system 100 is switched from the first using state to the second using state or the folded state, the second switch 822 can be operated to drive the fourth clamping member 823 to move away from the slit 825. The at least one intermediate plate 30 can rotate until to the position adjacent to the first folding mechanism 21, and the third clamping member 811 can be clamped into the slit 825. Under the action of the second elastic member 824, the fourth clamping member 823 is capable of recovering, and being clamped to and locked with the third clamping member 811.

Alternatively, in the present embodiment, two first positioning structures and two second positioning structures can be provided, and the two second positioning structures can be opposite to each other, so that two second switches 822 of the two second positioning structures can be adjacent to each other. Extending directions of the two fourth clamping members 823 corresponding to the two second positioning structures can be opposite to each other, which is convenient for the user to operate two second switches 822 to drive the two fourth clamping members 823 to move at the same time, respectively. Two third clamping members 811 of the two second positioning structures can be provided on opposite sides of the at least one intermediate plate 30, and the two third clamping members 811 of the two second positioning structures can be clamped into and fixed to two slits 825 corresponding to the two first supporting rods 211, respectively, so that the at least one intermediate plate 30 can be fixed to the first folding mechanism 21 firmly and stably.

Figures 17, 18:
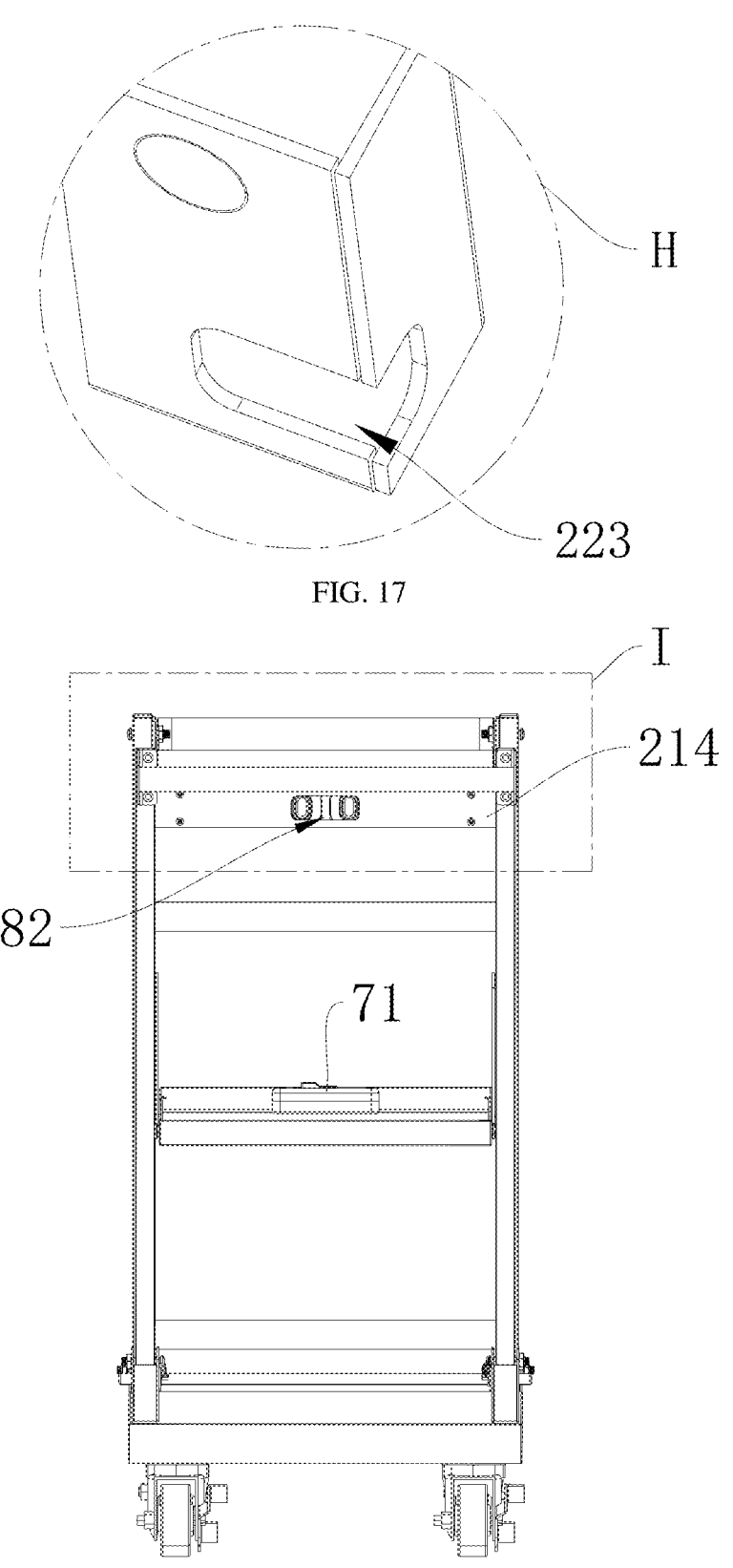
FIG. 17 is a partial enlarged figure of H portion in FIG. 15.
FIG. 18 is a structural schematic diagram of the storage system in FIG. 11 from another angle of view.
Figures 19, 20:
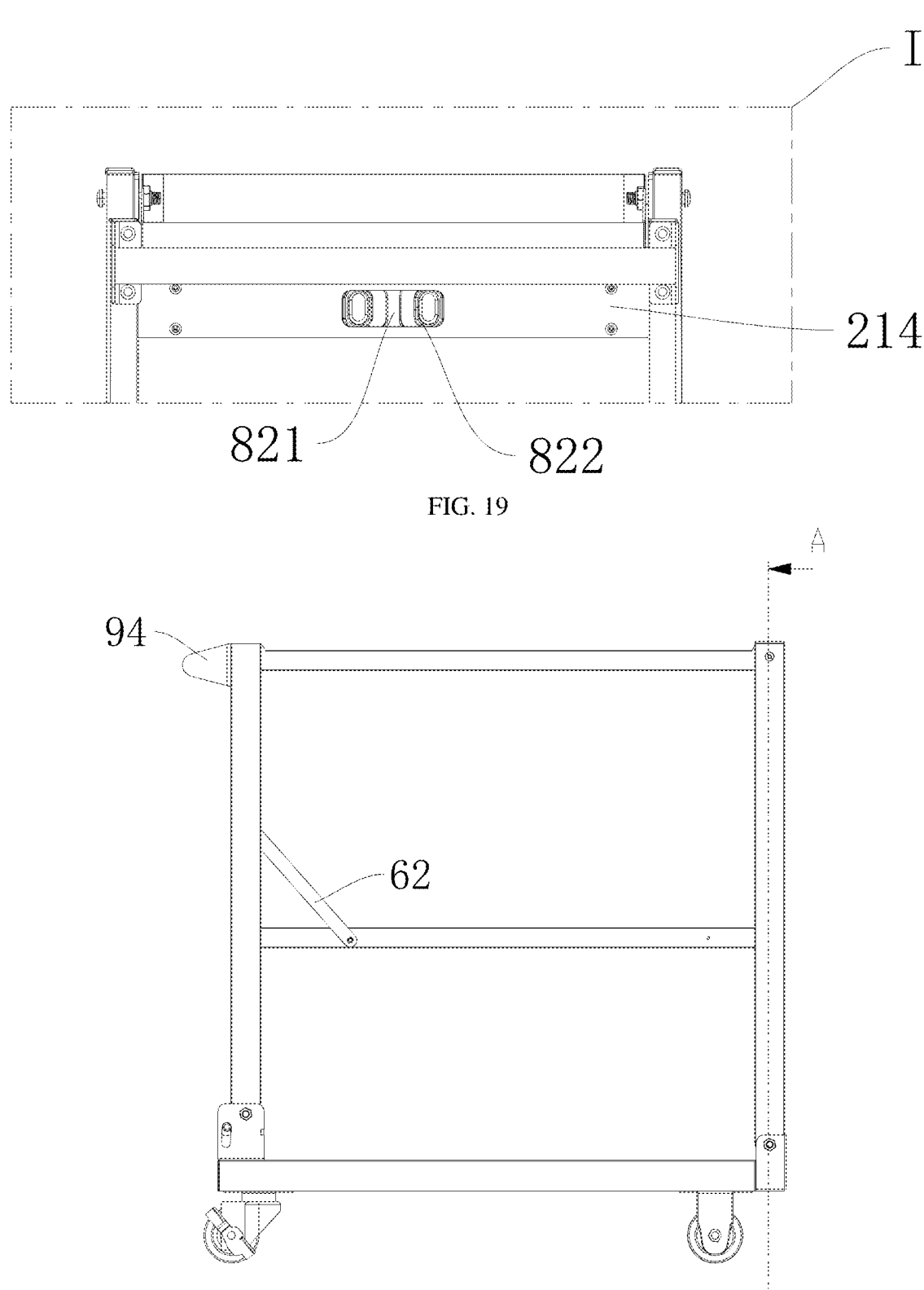
FIG. 19 is a partial enlarged figure of I portion in FIG. 18.
FIG. 20 is a structural schematic diagram of the storage system in FIG. 11 from another angle of view.
Figures 21, 22:
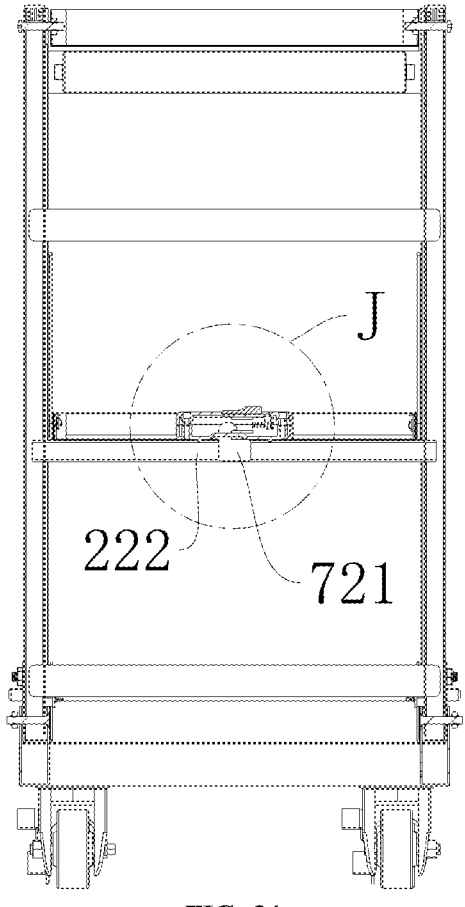
FIG. 21 is a structural schematic diagram of the storage system in FIG. 20 along a section A-A.
FIG. 22 is a partial enlarged figure of J portion in FIG. 21.
Figure 23:
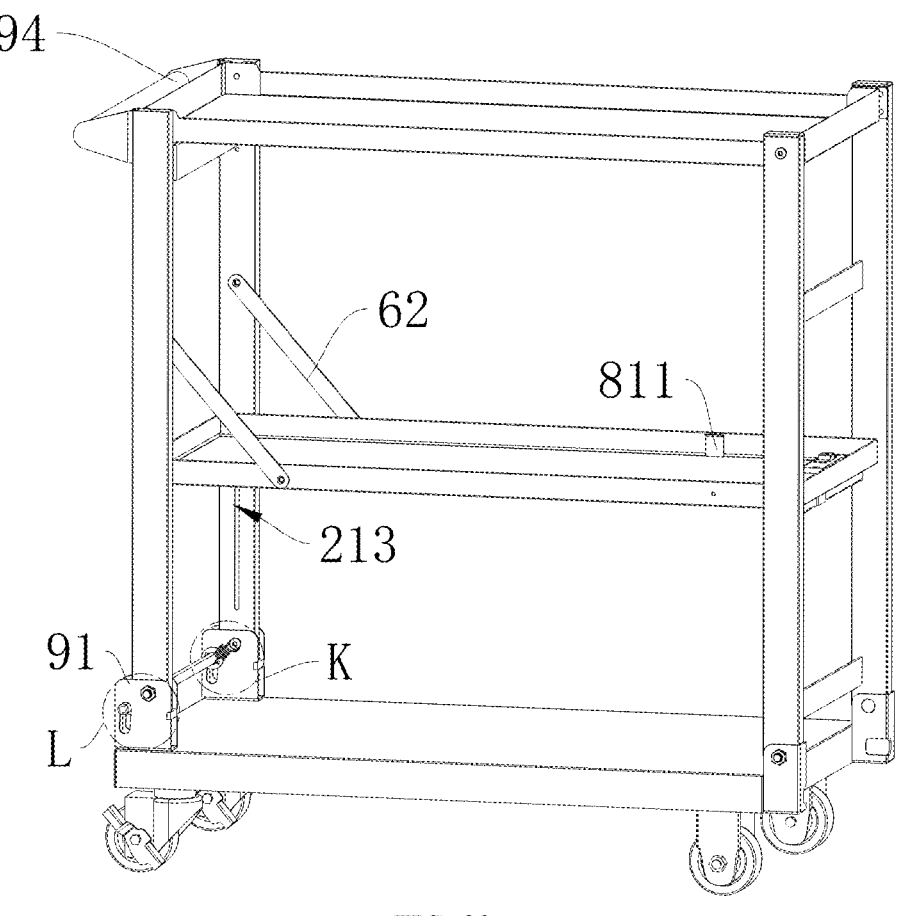
FIG. 23 is a structural schematic diagram of the storage system in FIG. 11 from another angle of view.
Figure 24:
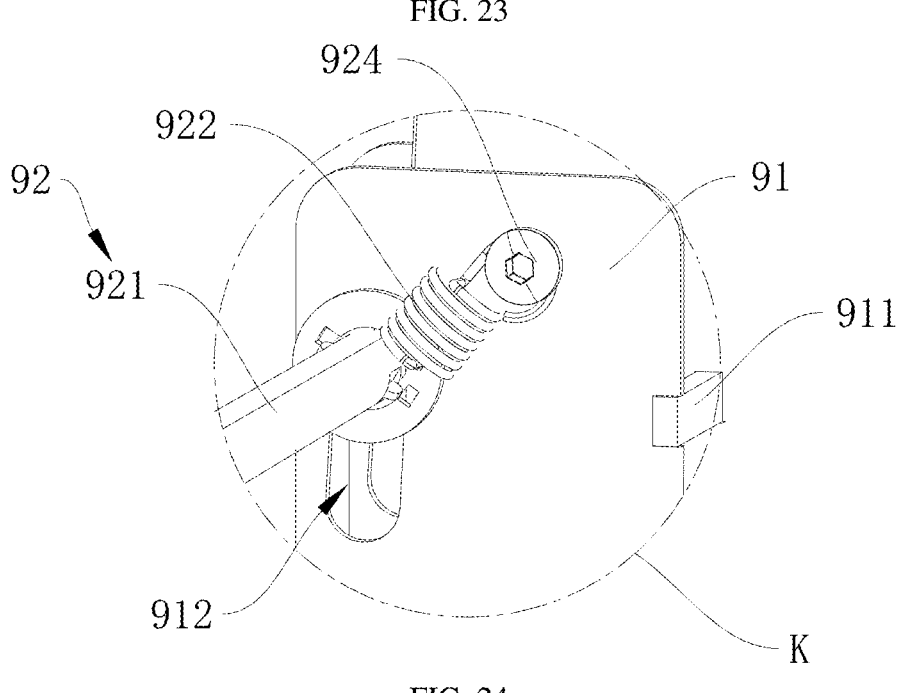
FIG. 24 is a partial enlarged figure of K portion in FIG. 23.

Furthermore, referring to FIG. 17, in the present embodiment, a side of second folding mechanism 22 adjacent to the chassis 10 can be provided with a second groove 223. When the top plate 50 is overturned to the outside of the second folding mechanism 22, the two third protrusions 51 on the top plate 50 can be clamped into two second grooves 223, respectively, so that the top plate 50 can be fixed to the outside of the second folding mechanism 22.

Furthermore, referring to FIG. 23 to FIG. 42, in the present embodiment, a side of the support 91 adjacent to the second folding mechanism 22 can be provided with a first abutting block 911, and a side of the support 91 away from the second folding mechanism 22 can be provided with a sliding groove 912. A second abutting block 215 protruding from the first supporting rod 211 can be provided. The locking structure 92 can include a foot rest lever 921 and a third elastic member 922. The foot rest lever 921 is capable of sliding in the sliding groove 912, and the third elastic member 922 can be connected to the foot rest lever 921 and capable of elastically acting on the foot rest lever 921. When the locking structure 92 is in the first locking state, the foot rest lever 921 can abut against the second abutting block 215 under elastic action of the third elastic member 922, and a side of the first supporting rod 211 away from the second abutting block 215 can abut against the first abutting block 911. When the locking structure 92 is in the second locking state, the foot rest lever 921 can abut against the side of the first supporting rod 211 away from the second abutting block 215 under the elastic action of the third elastic member 922. It is understood that the locking structure 92 can be switched from the second locking state to the first locking state, by applying a force to rotate the first folding mechanism 21 to a roughly vertical state.

Figures 27, 28:
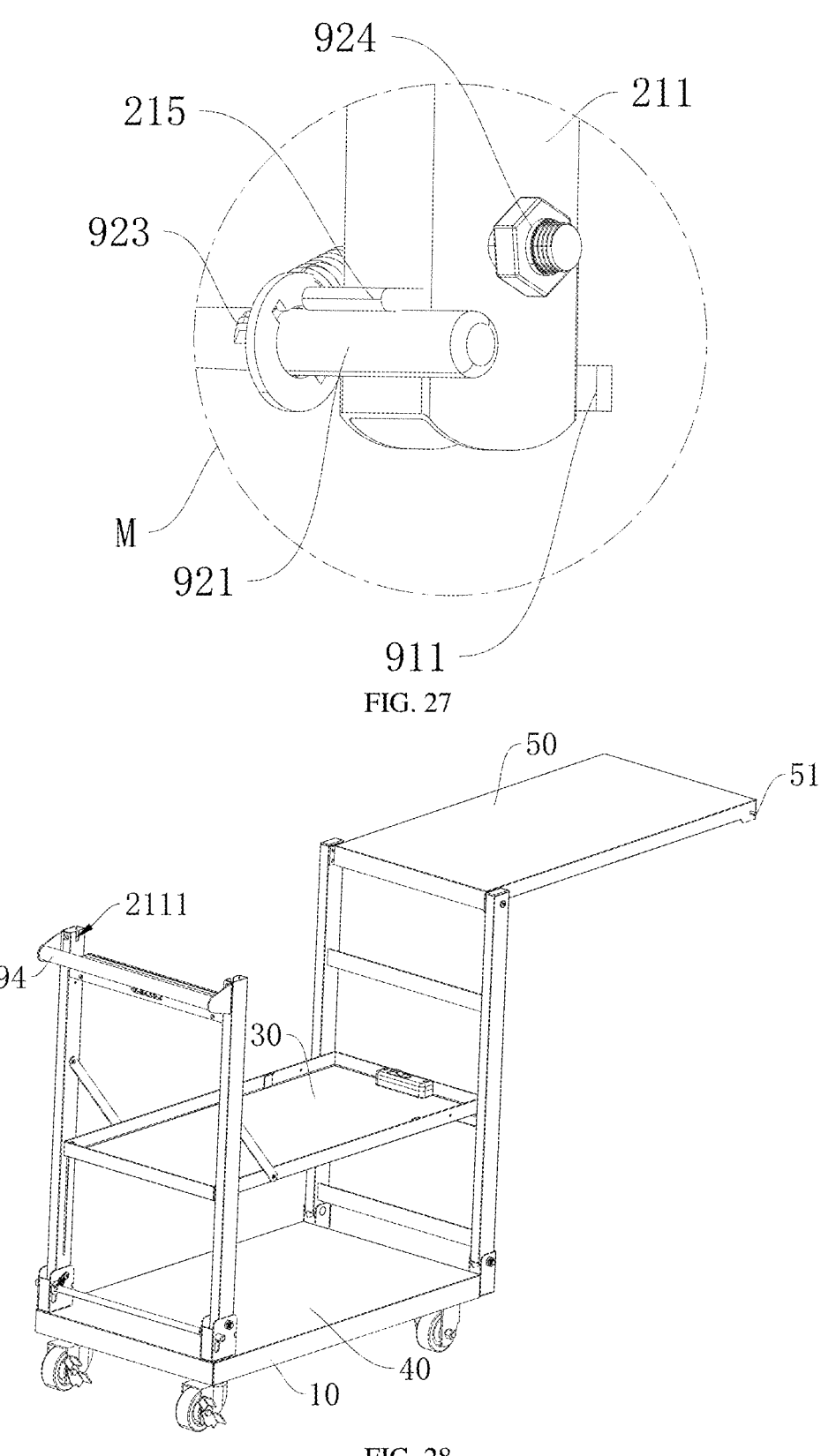
FIG. 27 is a partial enlarged figure of M portion in FIG. 26.
FIG. 28 is a structural schematic diagram of the storage system in FIG. 11.
Figure 29:
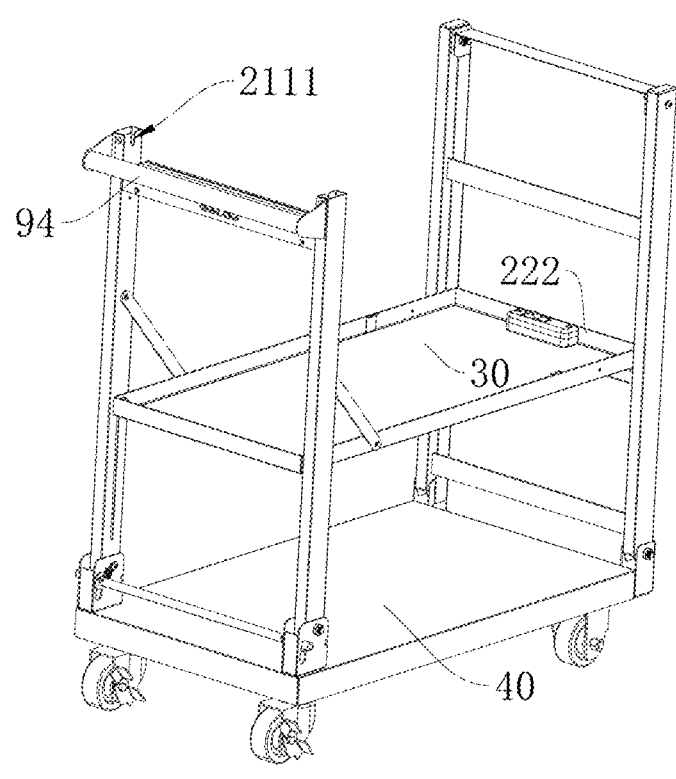
FIG. 29 is a structural schematic diagram of the storage system in FIG. 11.

Alternatively, referring to FIG. 27, in the present embodiment, a bottom of the first supporting rod 211 can be arc-shaped. In this way, when the first folding mechanism 21 rotate to the position adjacent to the chassis 10, the first supporting rod 211 with the arc-shaped bottom makes the first supporting rod 211 easier to rotate relative to the foot rest lever 921, improving smoothness of the first folding mechanism 21 during a folding and rotating process.

Figures 25, 26:
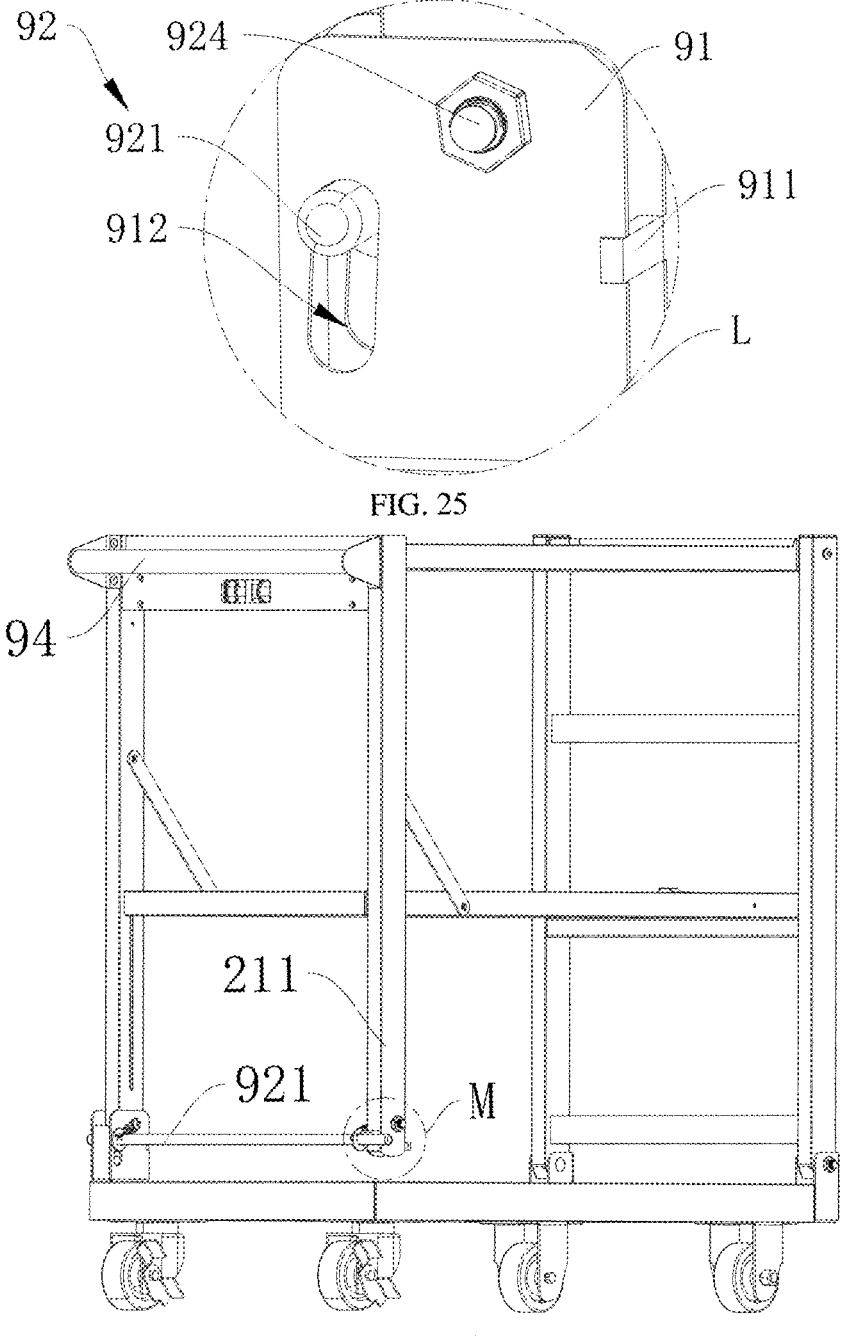
FIG. 25 is a partial enlarged figure of L portion in FIG. 23.
FIG. 26 is a partial structural schematic diagram of the storage system in FIG. 11.

Alternatively, referring to FIG. 26, in the present embodiment, the foot rest lever 921 can be a linear rod without the concave section. The foot rest lever 921 can be provided with a stop protrusion 923, a joint between the third elastic member 922 and the foot rest lever 921 can be located between the stop protrusion 923 and the support 91. In this way, the third elastic member 922 can be prevented from sliding on the foot rest lever 921, and the stability and reliability of the elastic action of the third elastic member 922 can be ensured.

Figure 30:
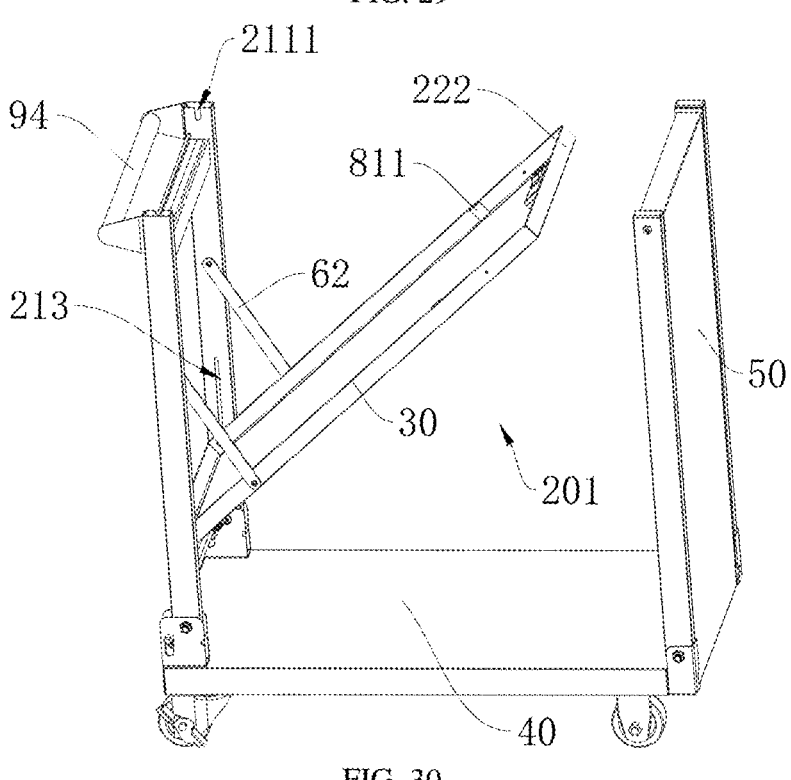
FIG. 30 is a structural schematic diagram of the storage system in FIG. 11.
Figures 31, 32:
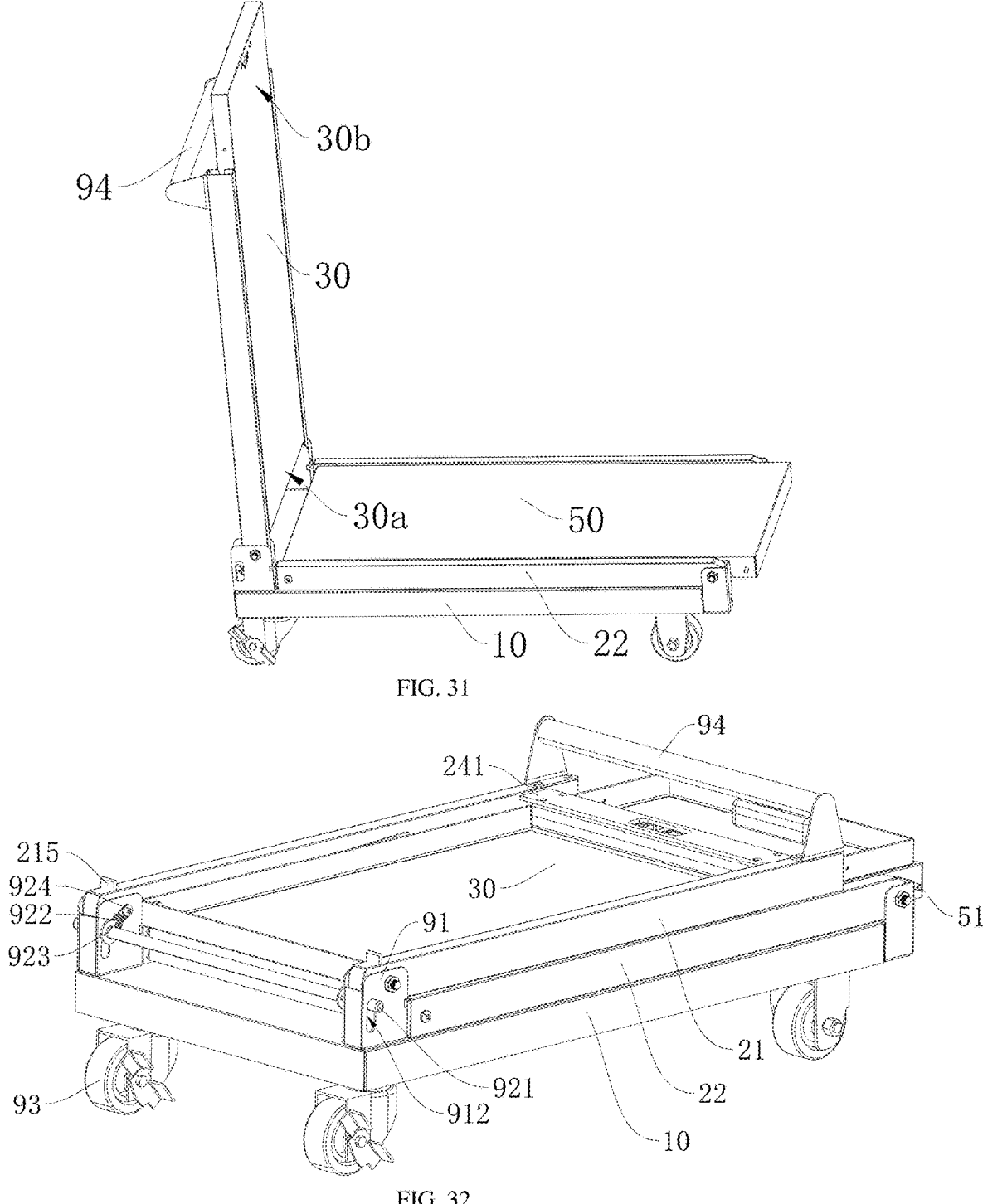
FIG. 31 is a structural schematic diagram of the storage system in FIG. 11 in a second using state.
FIG. 32 is a structural schematic diagram of the storage system in FIG. 11 in a folded state.
Figure 33:
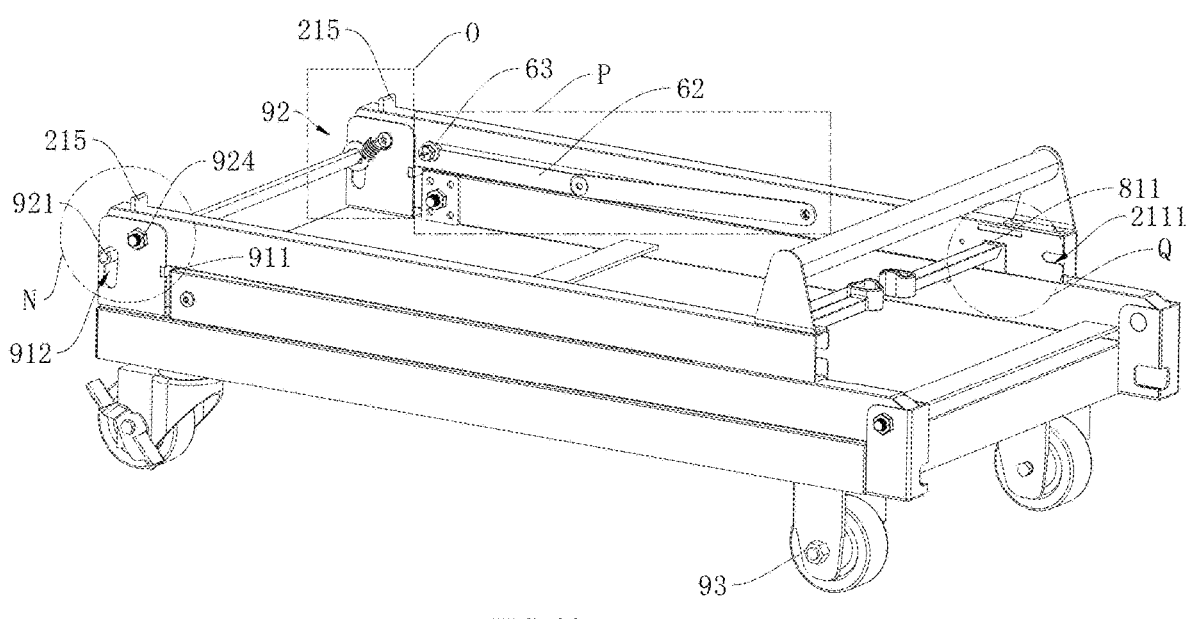
FIG. 33 is a structural schematic diagram of the storage system in FIG. 32 from another angle of view.
Figure 34:
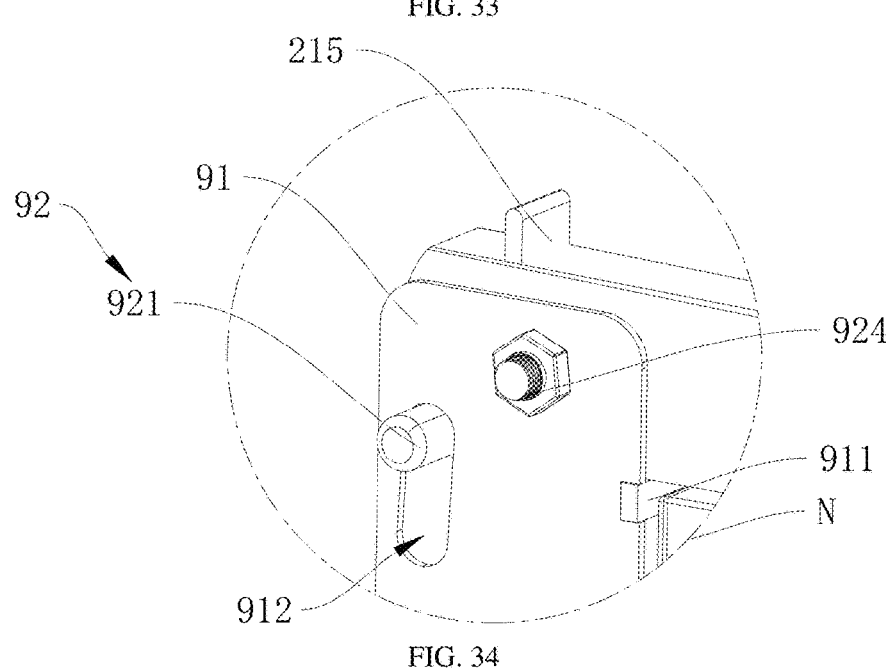
FIG. 34 is a partial enlarged figure of N portion in FIG. 33.
Figure 35:
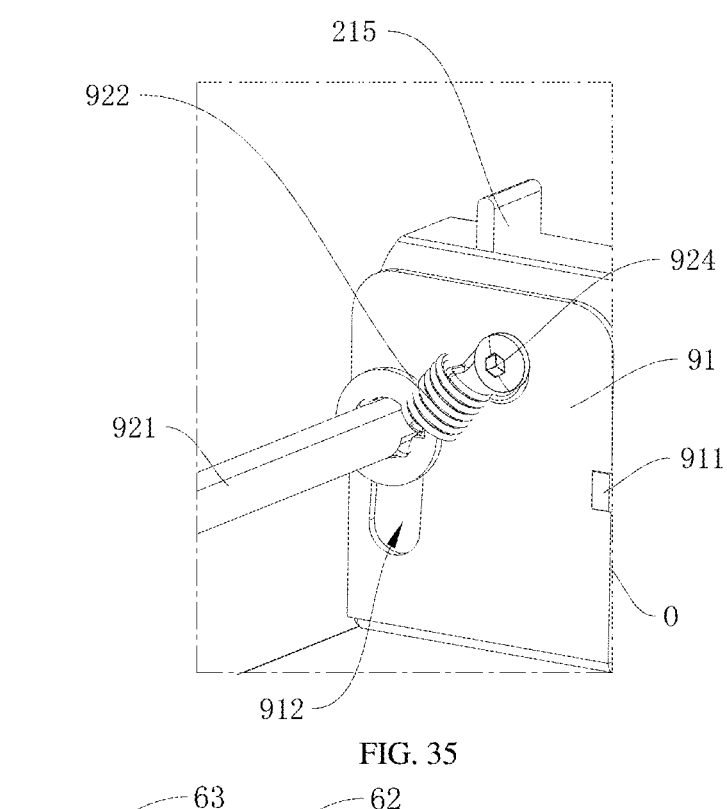
FIG. 35 is a partial enlarged figure of O portion in FIG. 33.
Figure 36:
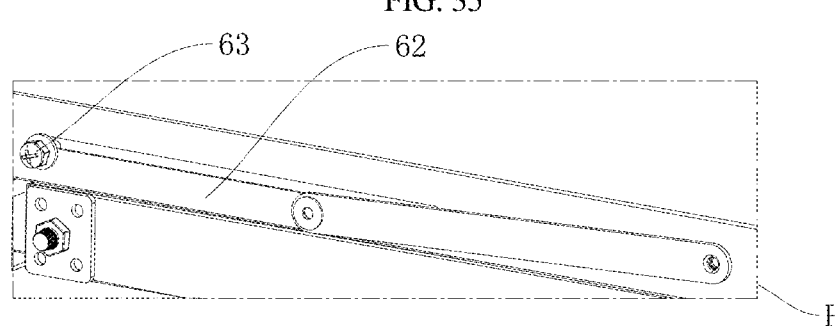
FIG. 36 is a partial enlarged figure of P portion in FIG. 33.
Figure 37:
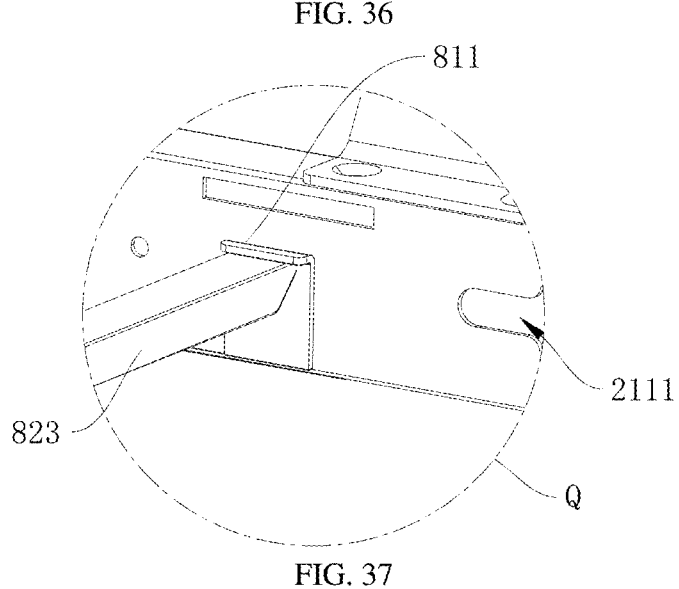
FIG. 37 is a partial enlarged figure of Q portion in FIG. 33.
Figures 38, 39:
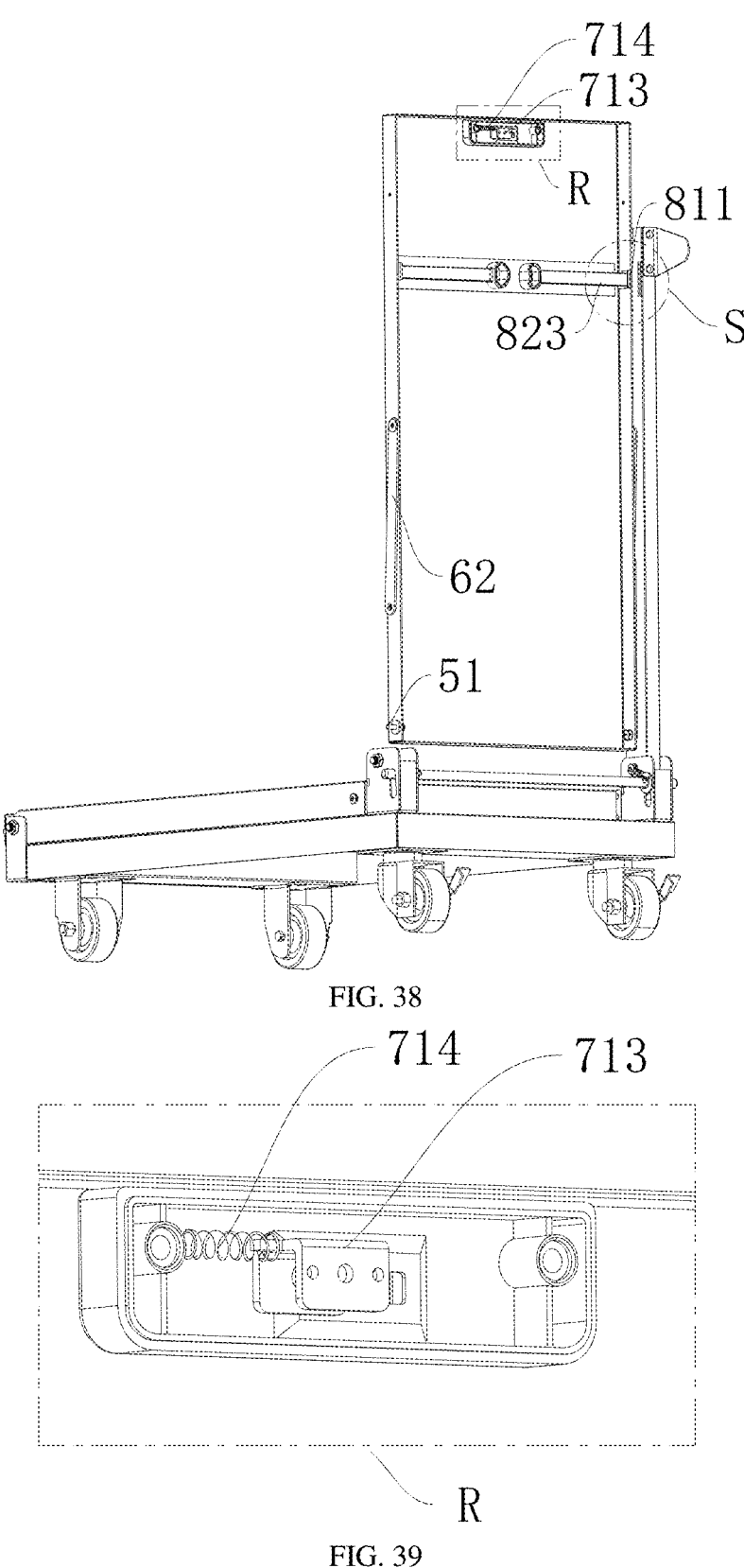
FIG. 38 is a partial structural schematic diagram of the storage system in FIG. 11 in a second using state.
FIG. 39 is a partial enlarged figure of R portion in FIG. 38.
Figure 40:
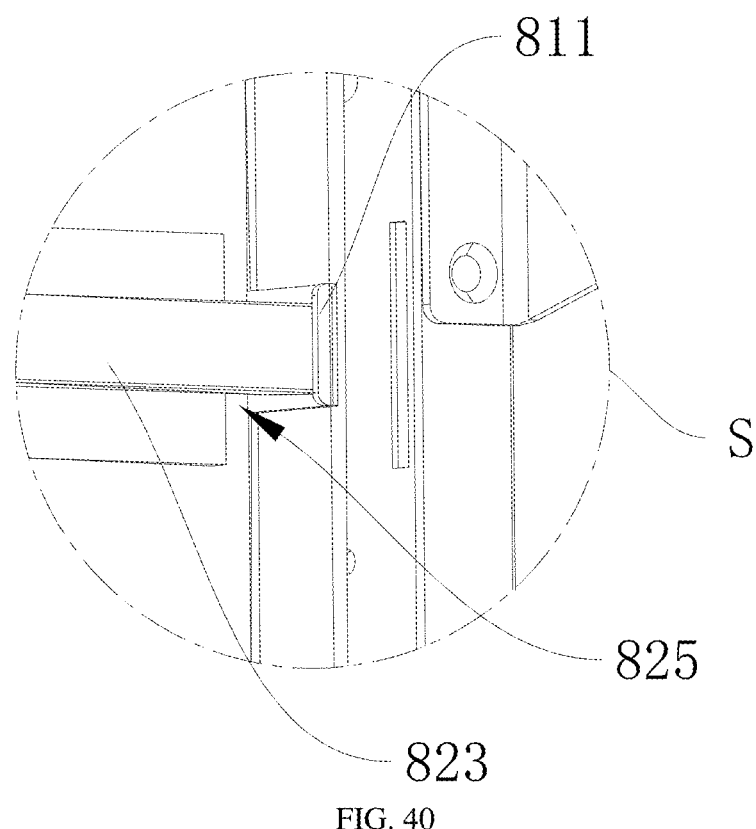
FIG. 40 is a partial enlarged figure of S portion in FIG. 38.
Figure 41:
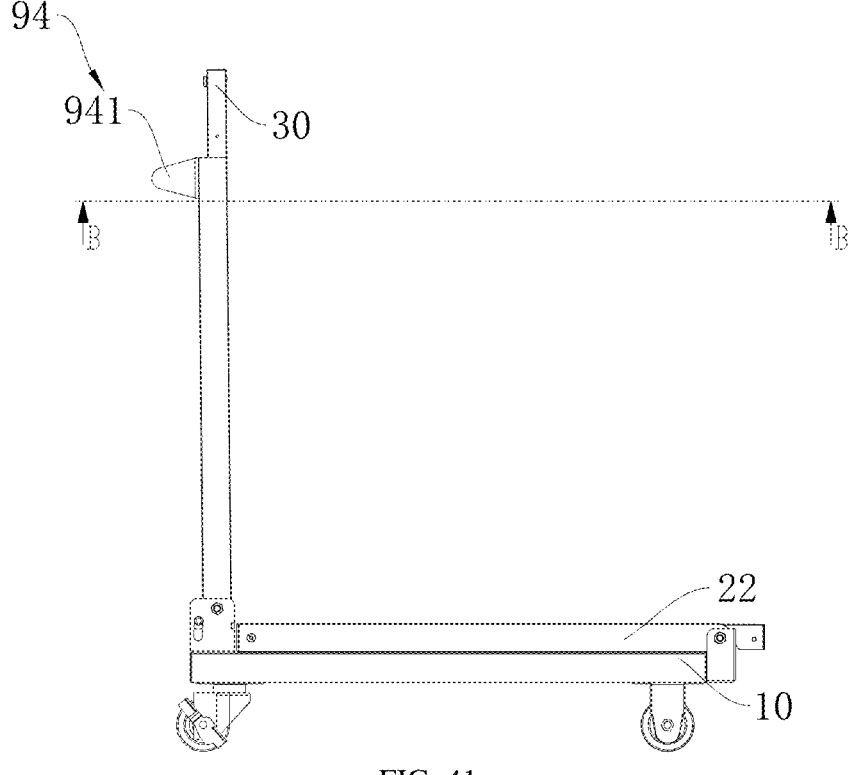
FIG. 41 is a side view of the storage system in FIG. 11 in a second using state.

Alternatively, referring to FIG. 30 to FIG. 32, in the present embodiment, a width of the at least one intermediate plate 30 and a width of the top plate 50 can be less than or equal to the distance between the two first supporting rod 211. A thickness of the at least one intermediate plate 30 and a thickness of the top plate 50 can be less than or equal to a thickness the first supporting rod 211, or a thicknesses of the at least one intermediate plate 30 and a thickness of the top plate 50 can be less than or equal to a thickness the second supporting rod 221. In this way, the at least one intermediate plate 30 can be accommodated between the two first supporting rods 211. The top plate 50 and/or the at least one intermediate plate 30 can be accommodated between the two second supporting rods 221. In this way, after the top plate 50 is overturned, the top plate 50 can be located between the two second supporting rods 221, and a thickness and a width of the second folding mechanism 22 folded to the chassis 10 will not increase. Furthermore, after the at least one intermediate plate 30 rotates to the position adjacent to the first folding mechanism 21, the at least one intermediate plate 30 can be located between the two first supporting rods 211. That is, after the at least one intermediate plate 30 rotates to the position adjacent to the first folding mechanism 21, the thickness and the width of the first folding mechanism 21 folded to the chassis 10 will not increase.

Furthermore, referring to FIG. 11, in the present embodiment, the handle 942 of the push-pull member 94 and the connecting member 941 of the push-pull member 94 can be separately disposed. The handle 942 can be a circular-shaped rod, and the connecting member 941 can be an iron sheet with a bended portion. Two ends of the circular-shaped rod can be connected to the first folding mechanism 21 via the connecting member 941, respectively. Moreover, a distance can be defined between the circular-shaped rod and the first folding mechanism 21 via the connecting member 941 with the bended portion, which is convenient for the user to hold the circular-shaped rod to push and pull the storage system 100 to move.

The present embodiment further provides a third embodiment (not shown), and an inventive concept of the third embodiment is the same as that of the first embodiment and that of the second embodiment. A connecting structure 60 in the third embodiment can be the same as the connecting structure 60 in the second embodiment, and the rest structures of a storage system of the third embodiment can be the same as that of the first embodiment.

The present embodiment further provides a fourth embodiment, and an inventive concept of the fourth embodiment is the same as that of the above embodiments. Most structures of a storage system of the fourth embodiment can be the same as that of the above embodiments, or some structures of the storage system of the fourth embodiment can be equivalently replaced, and differences between the fourth embodiment and the above embodiments are as follows.

Figure 49:
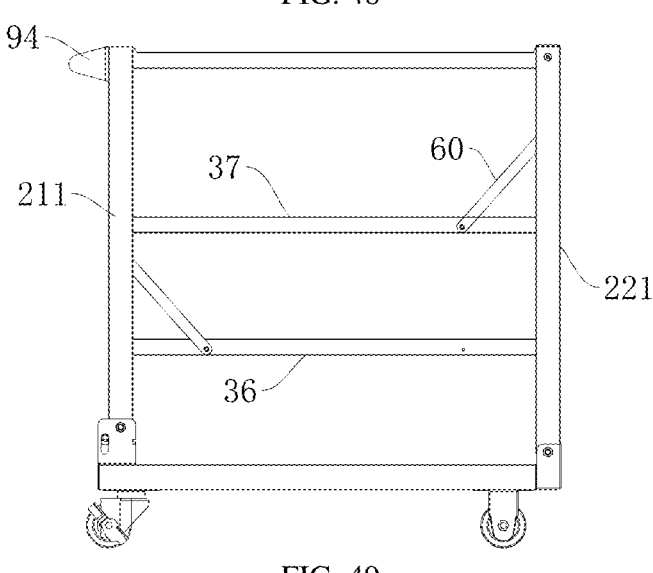
FIG. 49 is structural schematic diagram of a storage system in a fourth embodiment of the present disclosure in a first using state.

Referring to FIG. 49, the at least one intermediate plate 30 can include a first intermediate plate 36 and a second intermediate plate 37. The first intermediate plate 36 can be rotatably connected to the first supporting rod 211 via the connecting structure 60. A first end 30a of the first intermediate plate 36 is capable of rotating to a position adjacent to the bottom of the first folding mechanism 21 via the connecting structure 60, and a second end 30b of the first intermediate plate 36 is capable of rotating until to a position adjacent to the top of the first folding mechanism 21. The second intermediate plate 37 can be rotatably connected to the second supporting rod 221 via the connecting structure 60. A second end 30b of the second intermediate plate 37 is capable of rotating until to a position adjacent to the bottom of the second folding mechanism 22 via the connecting structure 60, and a first end 30a of the second intermediate plate 37 is capable of rotating until to a position adjacent to the top of the second folding mechanism 22.

The present embodiment further provides a fifth embodiment, and an inventive concept of the fifth embodiment is the same as that of the above embodiments. Most structures of a storage system of the fifth embodiment can be the same as that of the above embodiments, or some structures of the storage system of the fifth embodiment can be equivalently replaced, and differences between the fifth embodiment and the above embodiments are as follows.

Figures 44, 45:
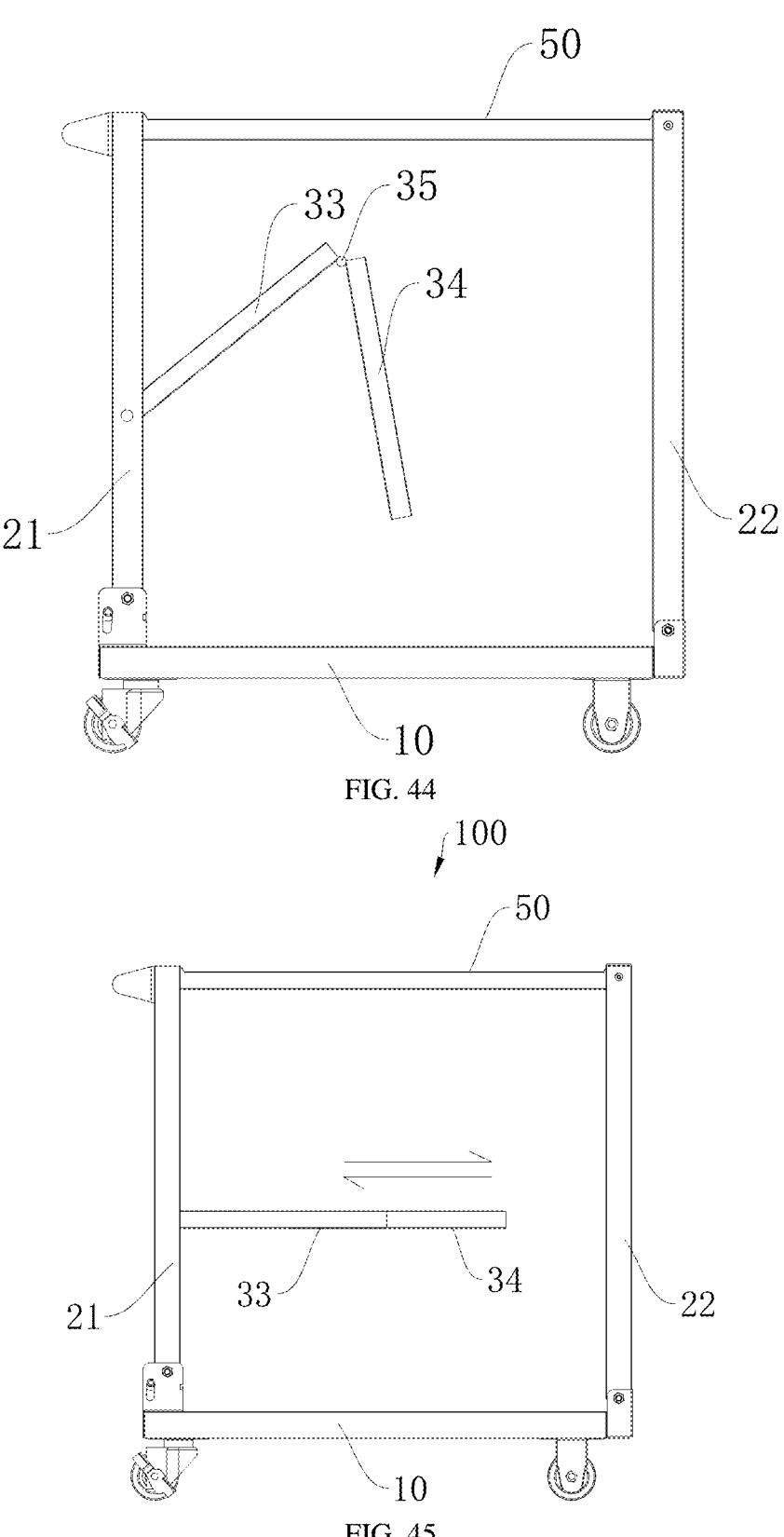
FIG. 44 is a structural schematic diagram of the storage system in FIG. 43.
FIG. 45 is a structural schematic diagram of a storage system in a sixth embodiment of the present disclosure.

Referring to FIG. 43 and FIG. 44, the at least one intermediate plate 30 can include a first plate body 33 and a second plate body 34. The first plate body 33 can be rotatably connected to the plurality of first supporting rods 211 by a plurality of connecting members 35, the second plate body 34 can be rotatably connected to the first plate body 33, and the second plate body 34 can be detachably connected to the plurality of second supporting rods 221. When the storage system is in the first using state, the first plate body 33 and the second plate body 34 can be located in the same plane and in the middle of the supporting frame 20. The first plate body 33 and the second plate body 34 are capable of being folded up and rotating together until to a position adjacent to the first folding mechanism 21, resulting in the storage system being switched to the folded state.

Figures 46, 47:
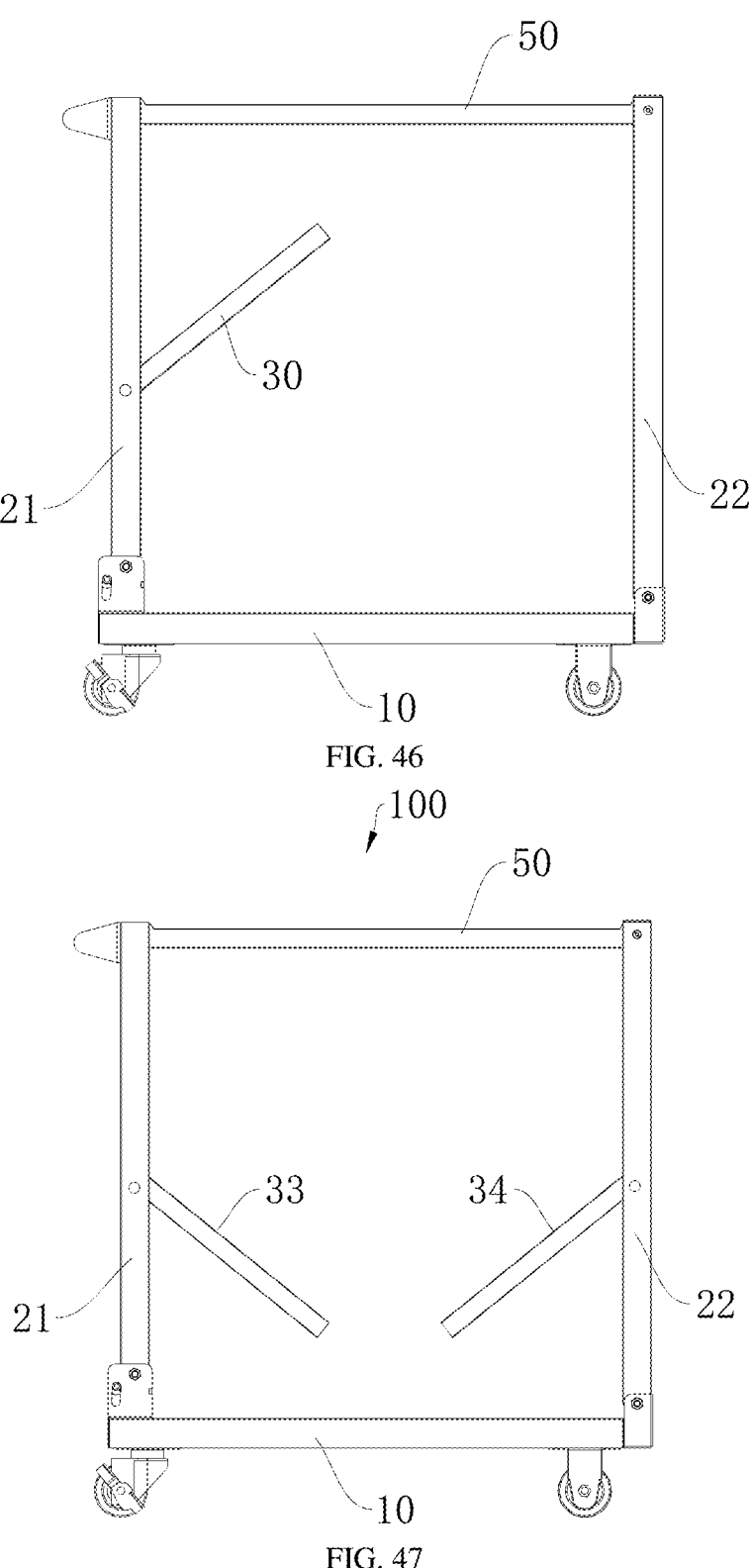
FIG. 46 is a structural schematic diagram of the storage system in FIG. 43.
FIG. 47 is a structural schematic diagram of a storage system in a seventh embodiment of the present disclosure.
Figure 48:
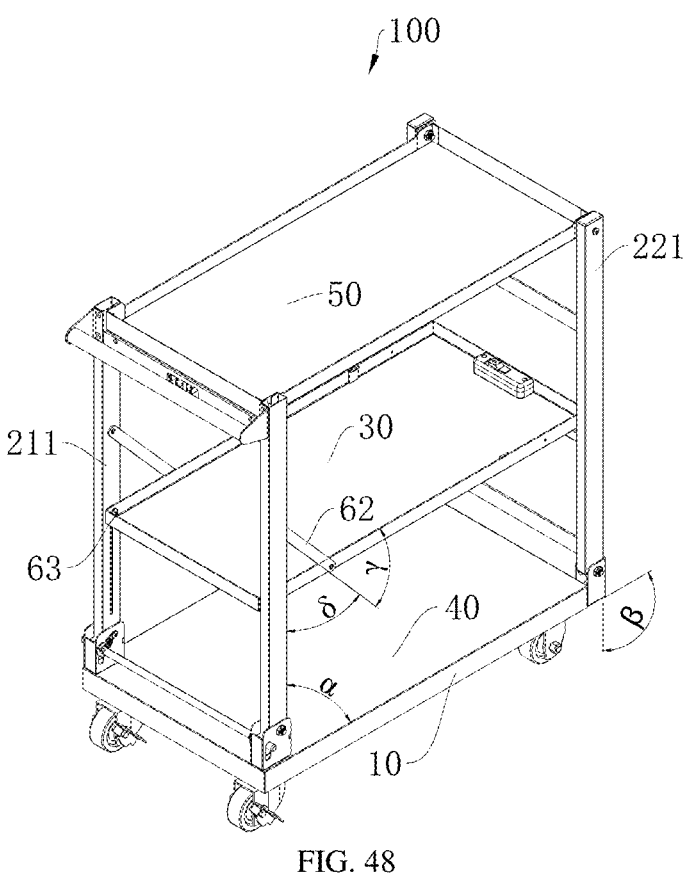
FIG. 48 is a structural schematic diagram of a storage system in a first embodiment of the present disclosure in a first using state.

The present embodiment further provides a sixth embodiment, and an inventive concept of the sixth embodiment is the same as that of the above embodiments. Most structures of a storage system of the sixth embodiment can be the same as that of the above embodiments, or some structures of the storage system of the sixth embodiment can be equivalently replaced, and differences between the sixth embodiment and the above embodiments are as follows. Referring to FIG. 45 and FIG. 46, the at least one intermediate plate 30 can include a first plate body 33 and a second plate body 34 connected with each other, and the first plate body 33 and the second plate body 34 can be slidable relative to each other. The first plate body 33 can be rotatably connected to the second supporting rod 221, and the second plate body 34 can be detachably connected to the second supporting rod 221. When the storage system is in the first using state, the second plate body 34 is capable of sliding out relative to the first plate body 33, and the second plate body 34 can be connected to the second supporting rod 221. When the storage system is in the folded state, the second plate body 34 can be separated from the second supporting rod 221. The second plate body 34 is capable of sliding and overlapping with the first plate body 33, and the first plate body 33 is capable of rotating along with the second plate body 34 to a position adjacent to the first folding mechanism 21.

It is understood that the second plate body 34 is capable of sliding and overlapping with the first plate body 33 means that the second plate body 34 can slide to the above, the below or the inside of the first plate body 33, so as to overlap with the first plate body 33.

The present embodiment further provides a seventh embodiment, and an inventive concept of the seventh embodiment is the same as that of the above embodiments. Most structures of a storage system of the seventh embodiment can be the same as that of the above embodiments, or some structures of the storage system of the seventh embodiment can be equivalently replaced, and differences between the seventh embodiment and the above embodiments are as follows. Referring to FIG. 47, the at least one intermediate plate 30 can include a first plate body 33 and a second plate body 34 detachably connected with each other. The first plate body 33 can be rotatably connected to the first supporting rod 211, and the second plate body 34 can be rotatably connected to the second supporting rod 221. When the storage system is in the first using state, the first plate body 33 and the second plate body 34 can be located in the same plane and in the middle of the supporting frame 20. When the storage system is in the folded state, the second plate body 34 is capable of rotating until to a position adjacent to the second folding mechanism 22 and the second folding mechanism 22 is capable of rotating along with the second plate body 34 until to a position adjacent to the chassis 10. The first plate body 33 is capable of rotating until to a position adjacent to the first folding mechanism 21 and the first folding mechanism 21 is capable of rotating along with the first plate body 33 until to the position adjacent to the second folding mechanism 22.

It is understood that some of the technical features in the above different embodiments may also be reorganized or equivalently replaced as required to form other implementable embodiments of the storage system 100.

in a striate system 100 of the present disclosure, the at least one intermediate plate 30 is capable of rotating until to a position adjacent to the first folding mechanism 21 and/or the second folding mechanism 22, so as to define a space 201 in the middle of the supporting frame 20. Therefore, the first folding mechanism 21, the second folding mechanism 22 and at least one intermediate plate 30 can fold and rotate until to a position adjacent to the bottom plate 40 through the space 201, so that the storage system 100 can be switched from the first using state to the folded state. When the storage system 100 is in the folded state, the first folding mechanism 21, the at least one intermediate plate 30, and the second folding mechanism 22 can abut against the bottom plate 40 sequentially or indirectly. In this way, an overall volume of the storage system 100 after folded can be effectively reduced, so that the storage the system 100 can maintain a high storage capacity in the first using state, and be easy to store and handle in the folded state.

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present disclosure.

The above-described embodiments are only several implementations of the present disclosure, and the descriptions are relatively specific and detailed, but they should not be construed as limiting the scope of the present disclosure. It should be understood by those of ordinary skill in the art that various modifications and improvements can be made without departing from the concept of the present disclosure, and all fall within the protection scope of the present disclosure. Therefore, the patent protection of the present disclosure shall be defined by the appended claims.

What is claimed is:

1. A storage system, comprising
a chassis;
a supporting frame comprising a plurality of first supporting rods and a plurality of second supporting rods, wherein the plurality of first supporting rods and the plurality of second supporting rods are connected to the chassis and rotatable relative to the chassis, the plurality of first supporting rods are defined as a first folding mechanism, and the plurality of second supporting rods are defined as a second folding mechanism; and
at least one intermediate plate movably connected to the supporting frame;
a support, and
a locking structure,
wherein the storage system has a first using state and a folded state;
when the storage system is in the first using state, a first angle is defined between the plurality of first supporting rods and the chassis, and a second angle is defined between the plurality of second supporting rods and the chassis, respectively, and the at least one intermediate plate is located at a middle of the supporting frame;
the at least one intermediate plate is capable of rotating to a position adjacent to the first folding mechanism and/or the second folding mechanism, so as to define a space in the middle of the supporting frame, the intermediate plate is further capable of rotating along with the first folding mechanism and/or the second folding mechanism; and the second folding mechanism is capable of rotating to a position adjacent to the chassis through the space, and the first folding mechanism is capable of rotating to a position adjacent to the second folding mechanism, so that the storage system is switched to the folded state,
the support is fixed to the chassis, the first folding mechanism is rotatably connected to the support, a height of the support matches with a thickness of the second folding mechanism;
when the storage system is in the folded state, the second folding mechanism is capable of rotating to a position parallel to the chassis and being in contact with the chassis, and the first folding mechanism is capable of rotating to a position parallel to the second folding mechanism and being in contact with the second folding mechanism, the locking structure is mounted on the support, the locking structure has a first locking state, a second locking state and an unlocking state;

when the locking structure is in the first locking state, the locking structure is capable of fixing the first folding mechanism to the first using state;

when the locking structure is in the second locking state, after the first folding mechanism folds and rotates to a position adjacent to the second folding mechanism, the locking structure is capable of fixing the first folding mechanism; and when the locking structure is in the unlocking state, the locking structure is capable of allowing the first folding mechanism to rotate, a side of the support adjacent to the second folding mechanism is provided with a first abutting block, a side of the support away from the second folding mechanism is provided with a sliding groove, a second abutting block protruding from the first supporting rod is provided, the locking structure comprises a foot rest lever and a third elastic member, the foot rest lever is capable of sliding in the sliding groove, and the third elastic member is connected to the foot rest lever and capable of elastically acting on the foot rest lever;

when the locking structure is in the first locking state, the foot rest lever abuts against the second abutting block under elastic action of the third elastic member, and a side of the first supporting rod away from the second abutting block abuts against the first abutting block; and when the locking structure is in the second locking state, the foot rest lever abuts against the side of the first supporting rod away from the second abutting block under the action of the third elastic member, a bottom of the first supporting rod is arc-shaped;

the foot rest lever is provided with a stop protrusion, a joint between the third elastic member and the foot rest lever is located between the stop protrusion and the support, the first supporting rod is rotatably connected to the support via a rotating shaft protruding from the support, and an end of the third elastic member is sleeved on the rotating shaft and the other end of the third elastic member is sleeved on the foot rest lever.

2. The storage system of claim 1, further comprising a connecting structure, the at least one intermediate plate is rotatably connected to the plurality of the first supporting rods via the connecting structure, the at least one intermediate plate comprises a first end and a second end away from each other, the first end of the at least one intermediate plate is capable of rotating to a bottom end of the first folding mechanism along with rotating of the connecting structure, and the second end of the at least one intermediate plate is capable of rotating to a top end of the first folding mechanism.

3. The storage system of claim 2, wherein the connecting structure comprises two first sliders, the two first sliders protrudes from two sides of the first end of the at least one intermediate plate, respectively, and the two sides of the first end of the at least one intermediate plate are away from each other, the number of the plurality of first supporting rods is two, each sidewall of the two first supporting rods is provided with a first sliding channel, respectively, the first sliding channel extends along an axis of the first supporting rod, and the two first sliders extend into the first sliding channel and are capable of sliding along the first sliding channel.

4. The storage system of claim 3, wherein the first sliding channel comprises a positioning section, a transitional section and a sliding section, which are successively connected with each other, both the positioning section and the transitional section are located at the top of the sliding section, the sliding section is located on a side of two first supporting rods adjacent to the bottom of the two first supporting rods, and a length of the sliding section is greater than a length of the positioning section;

when the at least one intermediate plate is located in the middle of the supporting frame, the two first sliders are located in the positioning section; the two first sliders are capable of sliding to the sliding section via the transitional section, and allowing the first end of the at least one intermediate plate to slide to the bottom end of the first folding mechanism.

5. The storage system of claim 2, wherein the connecting structure comprises two articulated rods, both ends of each of the two articulated rods are pivotally connected to the at least one intermediate plate and the first supporting rod, respectively, when the storage system is in the first using state, a third angle is defined between the articulated rod and the inter mediate plate, and a fourth angle is defined between the articulated rod and the first supporting rod.

6. The storage system of claim 5, wherein second sliders protruding from two sides of the first end of the at least one intermediate plate are provided, and the two sides of the first end of the at least one intermediate plate are away from each other, the number of the plurality of the first supporting rods is two, sidewalls of the two first supporting rods are provided with a second sliding channel, respectively, and the sidewalls of the two first supporting rods are opposite to each other, the two second sliding channels extend along an axis of the first supporting rod, and the two second sliders extend into the two second sliding channels, respectively, and are capable of sliding along the two second sliding channels, respectively.

7. The storage system of claim 2, wherein the at least one intermediate plates comprises a first intermediate plate and a second intermediate plate, the first intermediate plate is rotatably connected to the first supporting rod via the connecting structure, a first end of the first intermediate plate is capable of rotating to a position adjacent to the bottom of the first folding mechanism via the connecting structure, a second end of the first intermediate plate is capable of rotating to a position adjacent to the top of the first folding mechanism; and the second intermediate plate is rotatably connected to the second supporting rod via the connecting structure, a second end of the second intermediate plate is capable of rotating to a position adjacent to the bottom of the second folding mechanism via the connecting structure, and a first end of o the second intermediate plate is capable of rotating to a position adjacent to the top of the second folding mechanism.

8. The storage system of claim 1, wherein the at least one intermediate plate comprises a first plate body and a second plate body, and the first plate body is rotatably connected to the plurality of first supporting rods, the second plate body is rotatably connected to the first plate body, and the second plate body is detachably connected to the plurality of second supporting rods;

when the storage system is in the first using state, the first plate body and the second plate body are located in the same plane and in the middle of the supporting frame; and the first plate body and the second plate body are capable of being folded up and rotating together to a position adjacent to the first folding mechanism, resulting in the storage system being switched to the folded state.

9. The storage system of claim 1, wherein the at least one intermediate plate comprises a first plate body and a second plate body connected with each other, the first plate body and the second plate body are slidable relative to each other, the first plate body is rotatably connected to the second supporting rod, and the second plate body is detachably connected to the second supporting rod;

when the storage system is in the first using state, the second plate body is capable of sliding out relative to the first plate body, and the second plate body is connected to the second supporting rod; when the storage system is in the folded state, the second plate body is separated from the second supporting rod, the second plate body is capable of sliding and overlapping with the first plate body, and the first plate body is capable of rotating along with the second plate body to a position adjacent to the first folding mechanism.

10. The storage system of claim 1, wherein the at least one intermediate plate comprises a first plate body and a second plate body detachably connected with each other, the first plate body is rotatably connected to the first supporting rod, and the second plate body is rotatably connected to the second supporting rod;

when the storage system is in the first using state, the first plate body and the second plate body are located in the same plane and in the middle of the supporting frame; when the storage system is in the folded state, the second plate body is capable of rotating to a position adjacent to the second folding mechanism and the second folding mechanism is capable of rotating along with the second plate body to a position adjacent to the chassis, and the first plate body is capable of rotating to a position adjacent to the first folding mechanism and the first folding mechanism is capable of rotating along with the first plate body to the position adjacent to the second folding mechanism.

11. The storage system of claim 2, further comprising a first clamping structure and a second clamping structure, wherein the first clamping structure matches with the second clamping structure and is detachably connected with the second clamping structure, one of the first clamping structure and the second clamping structure is disposed on the at least one intermediate plate, the other of the first clamping structure and the second clamping structure is disposed on the second folding mechanism; and when the storage system is in the first using state, the first clamping structure and the second clamping structure are clamped to and fixed with each other, so that the at least one intermediate plate is fixed in the middle of the supporting frame.

12. The storage system of claim 11, wherein when the storage system is in the first using state, a side of the at least one intermediate plate towards the second folding mechanism is provided with a second protrusion and the second protrusion is defined as the first clamping structure, a side of the second supporting rod towards the at least one intermediate plate is provided with a positioning hole and the positioning hole is defined as the second clamping structure;

when the storage system is switched from the first using state to the folded state, the second protrusion is capable of separating from the positioning hole along with rotation of the at least one intermediate plate;

when the storage system is switched from the folded state to the first using state, the second protrusion is capable of rotating and being clamped in the positioning hole along with the rotation of the at least one intermediate plate, so that the at least one intermediate plate is kept in the middle of the supporting frame.

13. The storage system of claim 11, wherein the second folding mechanism comprises a first connecting rod, the first connecting rod is fixed between two second supporting rods and in the middle of the supporting frame, and the second clamping structure is disposed on the first connecting rod, and/or, the first clamping structure comprises a first pedestal, a first switch, a first clamping member and a first elastic member, the first pedestal is fixed to the at least one intermediate plate, the first pedestal is provided with a bar-shaped sliding slot, the first switch extends into the sliding slot and is capable of sliding in the sliding slot, both the first switch and the first elastic member are accommodated in the first pedestal, the first switch is fixed to the first clamping member, one end of the first elastic member abuts against an inner wall of the first pedestal, and the other end of the first elastic member is capable of elastically acting on the first clamping member;

the second clamping structure comprises a second clamping member, and the second clamping member is fixed to the first connecting rod;

the first clamping member is capable of moving along with the first switch, and the first clamping member and the first switch are capable of moving away from the second clamping member, resulting in the first camping member separating from and being unlocked with the second clamping member; and under the action of the first elastic member, the first clamping member is capable of recovering, and being clamped to and locked with the second clamping member.

14. The storage system of claim 2, further comprising a first positioning structure and a second positioning structure, wherein the first positioning structure matches with the second positioning structure and is detachably connected to the second positioning structure, one of the first positioning structure and the second positioning structure is disposed on the at least one intermediate plate, and the other of the first positioning structure and the second positioning structure is disposed on the first folding mechanism;

the first positioning structure is capable of clamping to and fixing with the second positioning structure, so that the at least one intermediate plate is capable of rotating to a position adjacent to the first folding mechanism and being fixed to the first folding mechanism.

15. The storage system of claim 14, wherein the first positioning structure comprises a first protrusion, the first protrusion is disposed on a side edge of the second end of the at least one intermediate plate, the second positioning structure comprises a first groove, the first groove is provided on the top of the first supporting rod, when the second end of the at least one intermediate plate rotates to a position adjacent to the top of the first supporting rod, the first protrusion is capable of clamping in the first groove.

16. The storage system of claim 15, wherein the first folding mechanism comprises a second connecting rod, the second connecting rod is fixed between the two first supporting rods and located at the top of the supporting frame, and the second positioning structure is disposed on the second connecting rod, and/or, the first positioning structure comprises a third clamping member, the second positioning structure comprises a second pedestal, a second switch, a fourth clamping member and a second elastic member, the second pedestal is fixed to the second connecting rod, and a slit is defined between the first supporting rod and the second pedestal; the second switch and the fourth clamping member are mounted on the second pedestal and capable of moving relative to the second pedestal, the second elastic member is configured to elastically act on the second switch or the fourth clamping member;

the fourth clamping member is capable of extending out from the second pedestal and extending into the slit, when the at least one intermediate plate rotates to the position adjacent to the first folding mechanism, the third clamping member is capable of entering into the slit;

the fourth clamping member is capable of moving along with the second switch and the fourth clamping member and the second switch are capable of moving away from the third clamping member, resulting in the third clamping member separating from and being unlocked with the fourth clamping member; and under the action of the second elastic member, the fourth clamping member is capable of recovering, and being clamped to and locked with the third clamping member.

17. The storage system of claim 14, wherein the storage system further has a second using state, when the storage system is in the second using state, the at least one intermediate plate is capable of rotating to a position adjacent to the first folding mechanism and being fixed to the first folding mechanism, and the storage system is in L-shaped.

\* \* \* \* \*